(12) United States Patent
Gao et al.

(10) Patent No.: US 12,143,564 B2
(45) Date of Patent: Nov. 12, 2024

(54) VIDEO ENCODING METHOD USING REFERENCE ENCODING PARAMETERS, VIDEO DECODING METHOD USING REFERENCE DECODING PARAMETERS, AND RELATED APPARATUSES

(71) Applicant: TENCENT TECHNOLOGY (SHENZHEN) COMPANY LIMITED, Guangdong (CN)

(72) Inventors: Xinwei Gao, Shenzhen (CN); Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 309 days.

(21) Appl. No.: 17/471,324

(22) Filed: Sep. 10, 2021

(65) Prior Publication Data

US 2021/0409685 A1    Dec. 30, 2021

Related U.S. Application Data

(63) Continuation of application No. PCT/CN2020/114173, filed on Sep. 9, 2020.

(30) Foreign Application Priority Data

Sep. 27, 2019   (CN) .......................... 201910927103.5

(51) Int. Cl.
*H04N 19/105*      (2014.01)
*H04N 19/132*      (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
None
See application file for complete search history.

(56) References Cited

U.S. PATENT DOCUMENTS

2002/0025001 A1\* 2/2002 Ismaeil ................. H04N 19/56
                                                      375/E7.113
2004/0161158 A1\* 8/2004 Kondo ................... H04N 19/60
                                                      375/E7.218
(Continued)

FOREIGN PATENT DOCUMENTS

CN        102461169 A       5/2012
CN        105959700 A       9/2016
(Continued)

OTHER PUBLICATIONS

Machine English Translation of Lin (Cn 109660796 A) (Year: 2019).\*

(Continued)

*Primary Examiner* — Mohammed Jebari
(74) *Attorney, Agent, or Firm* — Sughrue Mion, PLLC

(57) ABSTRACT

A video decoding method, a video encoding method, and a related apparatus are provided. In the video decoding method, for a current target video frame in a target video, reference decoding parameters in a reference frame may be obtained from video frames that have been decoded before the target video frame, and a target resolution may be obtained based on a decoding indication parameter obtained based on (e.g., fusing) the reference decoding parameters. The current target video frame may be decoded by using the target resolution.

19 Claims, 10 Drawing Sheets

(51) Int. Cl.
*H04N 19/159* (2014.01)
*H04N 19/176* (2014.01)
*H04N 19/30* (2014.01)
*H04N 19/46* (2014.01)

(52) U.S. Cl.
CPC .......... *H04N 19/176* (2014.11); *H04N 19/30* (2014.11); *H04N 19/46* (2014.11)

(56) References Cited

U.S. PATENT DOCUMENTS

| | | | |
|---|---|---|---|
| 2005/0094732 A1 | 5/2005 | Mukherjee | |
| 2005/0232499 A1* | 10/2005 | Ha | H04N 19/53 |
| | | | 382/236 |
| 2007/0247529 A1* | 10/2007 | Toma | H04N 23/951 |
| | | | 348/222.1 |
| 2009/0046935 A1* | 2/2009 | Akenine-Moller | G06T 9/00 |
| | | | 382/235 |
| 2009/0175343 A1* | 7/2009 | Pearlstein | H04N 19/51 |
| | | | 375/E7.125 |
| 2010/0316126 A1* | 12/2010 | Chen | H04N 19/57 |
| | | | 375/E7.123 |
| 2011/0013692 A1* | 1/2011 | Cohen | H04N 19/513 |
| | | | 375/240.2 |
| 2011/0170595 A1* | 7/2011 | Shi | H04N 19/176 |
| | | | 375/E7.243 |
| 2011/0299593 A1* | 12/2011 | Pettersson | H04N 19/573 |
| | | | 375/240.03 |
| 2012/0014450 A1* | 1/2012 | Ma | H04N 19/156 |
| | | | 375/E7.104 |
| 2012/0051440 A1* | 3/2012 | Parfenov | H04N 19/40 |
| | | | 375/240.26 |
| 2018/0338151 A1* | 11/2018 | Coulombe | H04N 19/136 |
| 2019/0289307 A9* | 9/2019 | Coulombe | H04L 65/762 |
| 2020/0228820 A1* | 7/2020 | Joshi | H04N 19/117 |
| 2022/0321893 A1* | 10/2022 | Mao | H04N 21/23418 |

FOREIGN PATENT DOCUMENTS

| | | | | |
|---|---|---|---|---|
| CN | 107155107 B | * | 8/2018 | ........... H04N 19/103 |
| CN | 108769681 A | | 11/2018 | |
| CN | 108924553 A | | 11/2018 | |
| CN | 109660796 A | * | 4/2019 | |
| CN | 110166771 A | | 8/2019 | |
| CN | 110636312 A | | 12/2019 | |

OTHER PUBLICATIONS

International Search Report for PCT/CN2020/114173 dated Nov. 27, 2020 (PCT/ISA/210).
Written Opinion for PCT/CN2020/114173 dated Nov. 27, 2020 (PCT/ISA/237).

* cited by examiner

VIDEO ENCODING METHOD USING REFERENCE ENCODING PARAMETERS, VIDEO DECODING METHOD USING REFERENCE DECODING PARAMETERS, AND RELATED APPARATUSES

CROSS-REFERENCE TO RELATED APPLICATION(S)

This application is a continuation application of International Application No. PCT/CN2020/114173, filed Sep. 9, 2020, claims priority to Chinese Patent Application No. 201910927103.5, filed with the China National Intellectual Property Administration on Sep. 27, 2019, the disclosures of which are incorporated by reference in their entireties.

FIELD

The disclosure relates to the field of audio and video encoding and decoding, and in particular, to video encoding and video decoding.

BACKGROUND

With the development of digital media technologies and computer technologies, videos are applied to various fields such as mobile communication, network monitoring, and network television. With the improvement of hardware performance and screen resolution, users' demand for high-definition videos is increasing.

Under the condition of limited mobile bandwidth, a codec generally encodes and decodes a video frame by using the same resolution, resulting in a relatively low peak signal to noise ratio (PSNR) in partial bandwidth.

SUMMARY

Example embodiments of the disclosure provide a video encoding method, a video decoding method, and related apparatuses, to resolve at least the technical problem of relatively low video encoding and decoding efficiency caused by complex processing operations provided in the related art.

According to an aspect of example embodiments of the disclosure, a video decoding method is provided, performed by a video processing device, the method including: determining a target video frame; obtaining, from video frames that have been decoded, reference decoding parameters of a reference frame associated with the target video frame, the reference decoding parameters including at least two of the following: a quantity of blocks in the reference frame that are decoded in a skip mode, a total quantity of blocks in the reference frame, a first quantity of intra-frame decoded blocks in the reference frame, a second quantity of inter-frame decoded blocks in the reference frame, an energy parameter of a motion vector (MV) in the reference frame, a third quantity of blocks of a first size in the reference frame, and a fourth quantity of blocks of a second size in the reference frame, the first size being less than the second size; determining a target resolution based on the reference decoding parameters; and decoding the target video frame by using the target resolution.

According to another aspect of example embodiments of the disclosure, a video encoding method is provided, performed by a video processing device, the method including: determining a target video frame; obtaining, from video frames that have been encoded, reference encoding parameters of a reference frame associated with the target video frame, the reference encoding parameters including at least two of the following: a quantity of blocks in the reference frame that are encoded in a skip mode, a total quantity of blocks in the reference frame, a first quantity of intra-frame encoded blocks in the reference frame, a second quantity of inter-frame encoded blocks in the reference frame, an energy parameter of an MV in the reference frame, a third quantity of blocks of a first size in the reference frame, and a fourth quantity of blocks of a second size in the reference frame, the first size being less than the second size; determining a target resolution based on the reference encoding parameters; and encoding the target video frame by using the target resolution.

According to still another aspect of example embodiments of the disclosure, a video decoding apparatus is provided, including: a decoding determining module, configured to determine a target video frame; an obtaining module, configured to obtain, from video frames that have been decoded, reference decoding parameters of a reference frame associated with the target video frame, the reference decoding parameters including at least two of the following: a quantity of blocks in the reference frame that are decoded in a skip mode, a total quantity of blocks in the reference frame, a first quantity of intra-frame decoded blocks in the reference frame, a second quantity of inter-frame decoded blocks in the reference frame, an energy parameter of an MV in the reference frame, a third quantity of blocks of a first size in the reference frame, and a fourth quantity of blocks of a second size in the reference frame, the first size being less than the second size; a first processing module, configured to determine a target resolution based on the reference decoding parameters; and a decoding module, configured to decode the target video frame by using the target resolution.

According to still another aspect of example embodiments of the disclosure, a video encoding apparatus is provided, including: an encoding determining module, configured to determine a target video frame; an obtaining module, configured to obtain, from video frames that have been encoded, reference encoding parameters of a reference frame associated with the target video frame, the reference encoding parameters including at least two of the following: a quantity of blocks in the reference frame that are encoded in a skip mode, a total quantity of blocks in the reference frame, a first quantity of intra-frame encoded blocks in the reference frame, a second quantity of inter-frame encoded blocks in the reference frame, an energy parameter of an MV in the reference frame, a third quantity of blocks of a first size in the reference frame, and a fourth quantity of blocks of a second size in the reference frame, the first size being less than the second size; a processing module, configured to determine a target resolution based on the reference encoding parameters; and an encoding module, configured to encode the target video frame by using the target resolution.

According to still another aspect of example embodiments of the disclosure, a non-transitory computer-readable storage medium is further provided, storing a computer program, the computer program being configured to perform the video decoding method or the video encoding method when being run.

According to yet another aspect of example embodiments of the disclosure, a video processing device is provided, including:
 a processor, a communication interface, a memory, and a communication bus,
 the processor, the communication interface, and the memory communicating with each other by using the communication bus, the communication interface being an interface of a communication module; and the memory being configured to store program code and transmit the program code to the processor, and the processor being configured to invoke instructions of the program code in the memory to perform the video decoding method or the video encoding method.

According to still another aspect of example embodiments of the disclosure, a computer program product including instructions is provided, the instructions, when run on a computer, causing the computer to perform the video decoding method or the video encoding method.

BRIEF DESCRIPTION OF THE DRAWINGS

The accompanying drawings described herein are used for providing a further understanding of the disclosure, and form part of the disclosure. Example embodiments of the disclosure and descriptions thereof are used for explaining the disclosure, and do not constitute any inappropriate limitation to the disclosure.

DETAILED DESCRIPTION

In order to make a person skilled in the art better understand the solutions of the disclosure, the following clearly and completely describes the technical solutions in the embodiments of the disclosure with reference to the accompanying drawings in the embodiments of the disclosure. Apparently, the described embodiments are only some of the embodiments of the disclosure rather than all of the embodiments. All other embodiments obtained by a person of ordinary skill in the art based on the embodiments of the disclosure without creative efforts shall fall within the protection scope of the disclosure.

In the specification, claims, and accompanying drawings of the disclosure, the terms "first", "second", and so on are intended to distinguish between similar objects but do not necessarily indicate a specific order or sequence. It is to be understood that the data termed in such a way is interchangeable in proper circumstances, so that the embodiments of the disclosure described herein may be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

According to an aspect of the embodiments of the disclosure, a video decoding method is provided. In an example embodiment, the video decoding method is applicable to, but is not limited to, an application environment shown in FIG. 1. The application environment includes a terminal 102 and a server 104. The terminal 102 and the server 104 communicate with each other by using a network. The terminal 102 may be, but is not limited to, a smartphone, a tablet computer, a laptop computer, a desktop computer, or the like, but is not limited thereto. The server 104 may be, but is not limited to, a computer processing device having a relatively strong data processing capability and a particular storage space.

The video decoding method and the video encoding method provided in the embodiments of the disclosure may be performed by a video processing device, and the video processing device has video encoding and decoding functions, for example, may be the terminal 102 or the server 104.

Figure 1:
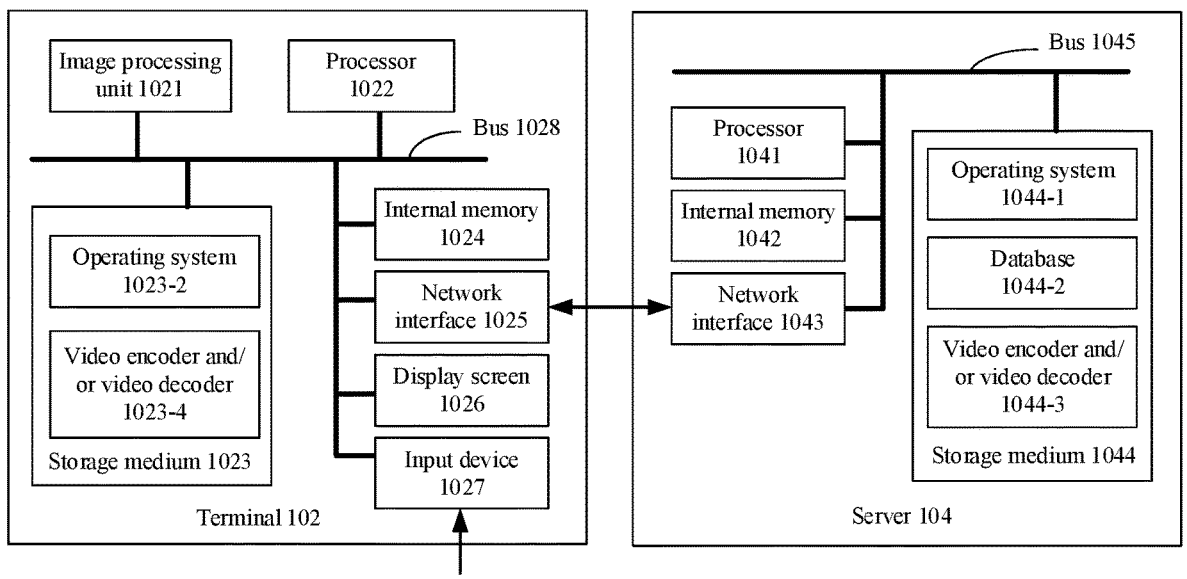
FIG. 1 is a schematic diagram of an application environment of a video decoding method according to an example embodiment of the disclosure.

The video encoding method corresponding to the video decoding method is alternatively applicable to, but is not limited to, the application environment shown in FIG. 1. After a target video is obtained, the video encoding method provided in the disclosure may be used to encode the target video, but is not limited thereto. Resolutions used to encode video frames in different target videos are adaptively determined through an interaction process between the terminal 102 and the server 104 shown in FIG. 1, so that different video frames are encoded by using different resolutions, thereby saving the transmission bandwidth and ensuring the encoding quality of a video frame, and the problem of distortion is avoided. In addition, after a target video is obtained, the video decoding method provided in the disclosure may be used to decode the target video, but is not limited thereto. Resolutions used to decode video frames in different target videos are adaptively determined through an interaction process between the terminal 102 and the server 104 shown in FIG. 1, so that different video frames are decoded by using different resolutions, thereby ensuring the decoding quality of a video frame, and the problem of distortion is avoided.

In an embodiment, the terminal 102 may include, but is not limited to, the following components: an image processing unit 1021, a processor 1022, a storage medium 1023, an internal memory 1024, a network interface 1025, a display screen 1026, and an input device 1027. The components may be connected by, but is not limited to, a system bus 1028. The image processing unit 1021 is configured to provide at least a drawing capability of a display interface. The processor 1022 is configured to provide computing and control capabilities, to support operation of the terminal 102. An operating system 1023-2 and a video encoder and/or a video decoder 1023-4 are stored in the storage medium 1023. The operating system 1023-2 is configured to provide a control operation instruction, and the video encoder and/or the video decoder 1023-4 is configured to perform an encoding/decoding operation according to the control operation instruction. In addition, the internal memory provides an operation environment for the video encoder and/or the video decoder 1023-4 in the storage medium 1023. The network interface 1025 is configured to perform network communication with a network interface 1043 in the server 104. The display screen 1026 is configured to display an application interface such as a video decoding interface. The input device 1027 is configured to receive a command, data, or the like entered by a user. For the terminal 102 having a touchscreen, the display screen 1026 and the input device 1027 may be the touchscreen. The internal structures of the terminal 102 shown in FIG. 1 are merely block diagrams of partial structures related to a solution in the disclosure, and do not constitute a limitation to the terminal to which the solution in the disclosure is applied. Specifically, the terminal 102 or the server 104 may include more components or fewer components than those shown in the figures, or some components may be combined, or a different component deployment may be used.

In an embodiment, the server 104 may include, but is not limited to, the following components: a processor 1041, internal memory 1042, a network interface 1043, and a storage medium 1044. The components may be connected by, but is not limited to, a system bus 1045. The storage medium 1044 includes an operating system 1044-1, a database 1044-2, a video encoder and/or a video decoder 1044-3. The processor 1041 is configured to provide computing and control capabilities, to support operation of the server 104. The internal memory 1042 provides an environment for operation of the video encoder and/or the video decoder 1044-3 in the storage medium 1044. The network interface 1043 is configured to connect to and communicate with the network interface 1025 of the external terminal 102 by using a network. The operating system 1044-1 in the storage medium is configured to provide a control operation instruction. The video encoder and/or the video decoder 1044-3 is configured to perform an encoding/decoding operation according to the control operation instruction. The database 1044-2 is configured to store data. The internal structures of the server shown in FIG. 1 are merely block diagrams of partial structures related to a solution in the disclosure, and do not constitute a limitation to a computer device to which the solution in the disclosure is applied. Specifically, the computer device has different component configurations.

In an embodiment, the network may include, but is not limited to, a wired network. The wired network may include, but is not limited to: a wide area network, a metropolitan area network, and a local area network. The foregoing is merely an example, and this is not limited in this embodiment.

Figure 2:
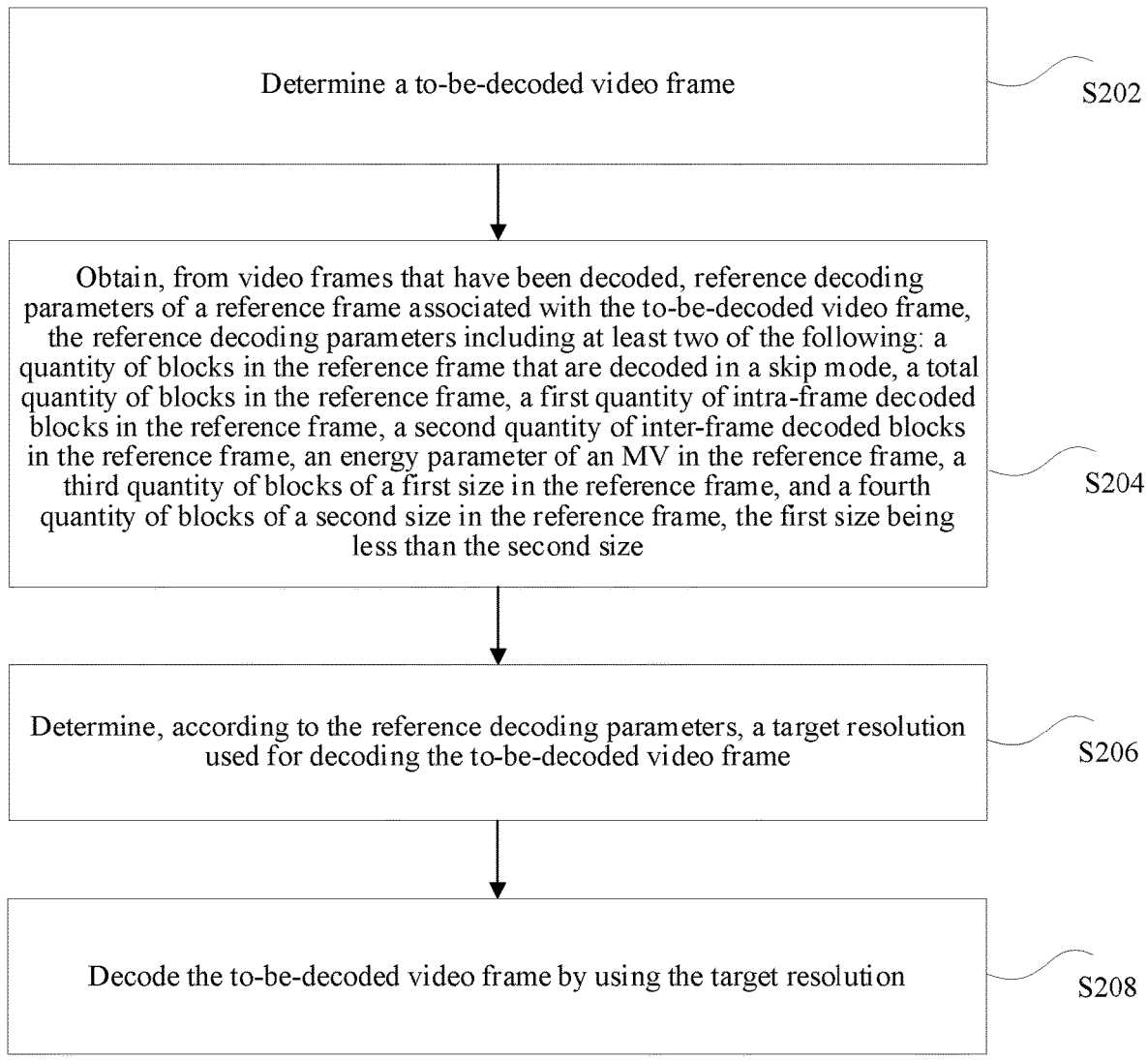
FIG. 2 is a flowchart of a video decoding method according to an example embodiment of the disclosure.

In an example embodiment, as shown in FIG. 2, the method includes the following operations.

S202: Determine a target video frame to be decoded (or referred to as a to-be-decoded video).

S204: Obtain, from video frames that have been decoded, reference decoding parameters of a reference frame associated with the target video frame, the reference decoding parameters including at least two of the following: a quantity of blocks in the reference frame that are decoded in a skip mode, a total quantity of blocks in the reference frame, a first quantity of intra-frame decoded blocks in the reference frame, a second quantity of inter-frame decoded blocks in the reference frame, an energy parameter of a motion vector (MV) in the reference frame, a third quantity of blocks of a first size in the reference frame, and a fourth quantity of blocks of a second size in the reference frame, the first size being less than the second size.

S206: Determine, according to the reference decoding parameters, a target resolution used for decoding the target video frame.

S208: Decode the target video frame by using the target resolution.

The video decoding method shown in FIG. 2 is applicable to, but is not limited to, the video decoder shown in FIG. 1. A decoding process of the target video frame is completed through interaction and cooperation between the video decoder and another component.

In an example embodiment, the video decoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (for example, the playing time is greater than 10 minutes) or a picture presented in a long video session, and the short video may be a voice message exchanged between two or more parties or a video with a relatively short playing time (for example, the playing time is less than or equal to 30 seconds) presented on a sharing platform. The foregoing is merely an example. The video decoding method provided in this embodiment is applicable to, but is not limited to, a playback device configured to play a video in the application scenario. After video frames that have been decoded are obtained, a target resolution used for decoding a target video frame to be decoded is adaptively determined based on reference decoding parameters of a reference frame determined from the video frames, to simplify operations of determining the target resolution used for decoding the target video frame, thereby overcoming the problem of the relatively low video decoding efficiency in the related art and achieving the effect of improving the decoding efficiency.

In this embodiment, for a determined target video frame, reference decoding parameters of a reference frame associated with the target video frame may be obtained from video frames that have been decoded, the reference decoding parameters including at least two of the following: a quantity of blocks in the reference frame that are decoded in a skip mode, a total quantity of blocks in the reference frame, a first quantity of intra-frame decoded blocks in the reference frame, a second quantity of inter-frame decoded blocks in the reference frame, an energy parameter of an MV in the reference frame, a third quantity of blocks of a first size in the reference frame, and a fourth quantity of blocks of a second size in the reference frame, the first size being less than the second size; and a target resolution used for decoding the target video frame is determined by using a relationship between the reference decoding parameters, and the target video frame is decoded by using the target resolution. Therefore, the resolution used for decoding the target video frame is determined by using the relationship between the reference decoding parameters in the reference frame, to adaptively select different resolutions for different target video frames and simplify operations of determining the target resolution used for decoding the target video frame, thereby overcoming the problem of the relatively low video decoding efficiency in the related art and achieving the effect of improving the decoding efficiency.

In an example embodiment, after a target video frame to be decoded is determined from a bitstream received from an encoding device, a reference frame may be determined from, but is not limited to, video frames that have been decoded, and at least two of the following reference decoding parameters are obtained from the reference frame, to determine a decoding indication parameter (which is used for comparison with a preset threshold, and a result of the comparison is used for determining the target resolution):

(1) obtaining a reciprocal of a ratio of a quantity of blocks in the reference frame that are decoded in a skip mode to a total quantity of blocks in the reference frame as a first reference value;

(2) obtaining a ratio of a first quantity of intra-frame decoded blocks to a second quantity of inter-frame decoded blocks in the reference frame as a second reference value;

(3) obtaining an energy parameter of an MV (for example, an average value of the MV and/or a variance of the MV) in the reference frame, to determine an energy value of the MV as a third reference value; and (4) obtaining a ratio of a third quantity of blocks of a first size to a fourth quantity of blocks of a second size in the reference frame as a fourth reference value.

In an example embodiment, before a target resolution used for decoding a current target video frame is adaptively determined, a determining basis may be determined in, but is not limited to, the following manner:

(1) obtaining the reference decoding parameters in the same manner from a decoding device of a decoder side according to a policy agreed on with an encoding device of an encoder side; and (2) parsing a flag bit from a bitstream, and obtaining the reference decoding parameters according to an indication of the flag bit. This is not limited in this embodiment.

In this embodiment, the skip mode (or may be referred to as a skip mode in the following) may include, but is not limited to: a P-skip macroblock and a B-skip macroblock. The P-skip macroblock is a special P macroblock and is applied to H.264. For a general P macroblock, both a pixel difference and a motion vector difference (MVD) are written into a bitstream and are transmitted from an encoder side to a decoder side. However, the P-skip macroblock is special in that neither the pixel difference nor the MVD is transmitted (in this case, both the pixel difference and the MVD are 0, which do not need to be transmitted). In addition to transmitting a small quantity of bits used for identifying the macroblock as the P-skip macroblock, the encoder side does not need to transmit other information about the macroblock.

In addition, for the decoder side, an MVP may be obtained from the decoder side when the MVD is zero according to a formula: MVD=MV−MVP, to obtain an MV. There is a reconstructed pixel of a macroblock corresponding to a reference frame on the decoder side. A pixel value of the macroblock of this frame may be recovered (if the MV is a fraction, interpolation is required) according to the reconstructed pixel and the MV. This is a so-called P-skip macroblock principle. Literally, the P-skip macroblock principle can be understood as skipping the macroblock, which is equivalent to not encoding the macroblock. An approximate alternative recovery method is adopted on the decoder side. A B-skip macroblock principle is similar to the P-skip macroblock principle, which is processed from front and rear directions. Details are not described herein again.

In an example embodiment, the energy parameter of the MV in the reference frame is used for determining an energy value, and the determining manner includes:

(1) if the energy parameter includes an average value of the MV, determining the energy value according to the average value of the MV;

(2) if the energy parameter includes a variance of the MV, determining the energy value according to the variance of the MV; and (3) if the energy parameter includes the average value of the MV and the variance of the MV, performing weighted summation on the average value of the MV and the variance of the MV, to obtain the energy value.

Each pixel in the reference frame has a corresponding MV. In this embodiment, the energy parameter may include, but is not limited to: an average value of two-dimensional vector lengths (or may be referred to as moduli of MVs) of the MVs in the reference frame and a square of a modulus of a difference vector between an average vector and each MV in the reference frame. A value in an $i^{th}$ dimension in the average vector may be, but is not limited to, an average value of the MVs in the $i^{th}$ dimension.

The target resolution may be determined separately for the reference decoding parameters:

(1) The determining, according to a relationship between a quantity of blocks that are decoded in the skip mode and a total quantity of blocks, a target resolution used for decoding the target video frame may include, but is not limited to: obtaining a reciprocal of a ratio of the quantity of blocks that are decoded in the skip mode to the total quantity of blocks; and determining the target resolution according to a result of comparison between the reciprocal and a preset threshold. For example, a first resolution is used as the target resolution when the reciprocal is greater than the preset threshold; and a second resolution is used as the target resolution when the reciprocal is less than the preset threshold, the second resolution being greater than the first resolution. Alternatively, in this embodiment, the determining, according to a relationship between a quantity of blocks that are decoded in the skip mode and a total quantity of blocks, a target resolution used for decoding the target video frame may include, but is not limited to: obtaining a difference between the total quantity of blocks in the reference frame and the quantity of blocks that are decoded in the skip mode; obtaining a ratio of the difference to the total quantity of blocks, and using a first resolution as the target resolution when the ratio is greater than a preset threshold; and using a second resolution as the target resolution when the ratio is less than the preset threshold, the second resolution being greater than the first resolution.

(2) The determining, according to a relationship between a first quantity of intra-frame decoded blocks and a second quantity of inter-frame decoded blocks, a target resolution used for decoding the target video frame may include, but is not limited to: obtaining a ratio of the first quantity of intra-frame decoded blocks to the second quantity of inter-frame decoded blocks; and determining the target resolution according to a result of comparison between the ratio and a preset threshold. For example, a first resolution is used as the target resolution when the ratio is greater than the preset threshold; and a second resolution is used as the target resolution when the ratio is less than the preset threshold, the second resolution being greater than the first resolution. That is, when a quantity of inter-frame decoded blocks is larger, a ratio is smaller, and a higher resolution is used. Alternatively, in this embodiment, the determining, according to a relationship between a first quantity of intra-frame decoded blocks and a second quantity of inter-frame decoded blocks, a target resolution used for decoding the target video frame may include, but is not limited to: obtaining the first quantity of intra-frame decoded blocks and the second quantity of inter-frame decoded blocks in the reference frame; using a first resolution as the target resolution when the first quantity is greater than the second quantity and a difference between the first quantity and the second quantity is greater than a preset threshold; and using a second resolution as the target resolution when the difference between the first quantity and the second quantity is less than the preset threshold, the second resolution being greater than the first resolution. That is, when the first quantity is greater than the second quantity, and as a quantity of inter-frame decoded blocks increases, a difference between the first quantity and the second quantity decreases, and a higher resolution is used. In comparison, as a quantity of inter-frame decoded blocks decreases, a difference between the first quantity and the second quantity increases, and a lower resolution is used. The determining manner is merely an example, and is not limited in this embodiment.

(3) Determine an energy value of the reference frame according to the energy parameter, and determine, according to a relationship between the energy value and a preset threshold, a target resolution used for decoding the target video frame. For example, a first resolution is used as the target resolution when the energy value is greater than the preset threshold; and a second resolution is used as the target resolution when the energy value is less than the preset threshold, the first resolution being less than the second resolution.

(4) The determining, according to a relationship between a third quantity of blocks of a first size and a fourth quantity of blocks of a second size in the reference frame, a target resolution used for decoding the target video frame may include, but is not limited to: obtaining a ratio of the third quantity of blocks of the first size to the fourth quantity of blocks of the second size; and determining the target resolution according to a result of comparison between the ratio and a preset threshold. For example, a first resolution is used as the target resolution when the ratio is greater than the preset threshold; and a second resolution is used as the target resolution when the ratio is less than the preset threshold, the second resolution being greater than the first resolution. That is, when a quantity of blocks of the second size is larger, a ratio is smaller, and a higher resolution is used. Moreover, in this embodiment, the determining, according to a relationship between a third quantity of blocks of a first size and a fourth quantity of blocks of a second size in the reference frame, a target resolution used for decoding the target video frame may alternatively include, but is not limited to: obtaining the third quantity of blocks of the first size and the fourth quantity of blocks of the second size in the reference frame; using a first resolution as the target resolution when the third quantity is greater than the fourth quantity and a difference between the third quantity and the fourth quantity is greater than a preset threshold; and using a second resolution as the target resolution when the difference between the third quantity and the fourth quantity is less than the preset threshold, the second resolution being greater than the first resolution. That is, when the third quantity is greater than the fourth quantity, as a quantity of blocks of the second size increases, a difference between the third quantity and the fourth quantity decreases, and a higher resolution is used.

In addition, for the reference decoding parameters, the target resolution may be further determined by, but is not limited to, performing integration to obtain a decoding indication parameter. That is, weighted summation may be performed on the reference decoding parameters by using, but is not limited to, a preset weight, to obtain a decoding indication parameter for comparison with a preset threshold, thereby determining, according to the decoding indication parameter, the target resolution used for decoding the target video frame. For example, a first resolution is used as the target resolution when the decoding indication parameter is greater than the preset threshold; and a second resolution is used as the target resolution when the decoding indication parameter is less than the preset threshold, the second resolution being greater than the first resolution.

In an example embodiment, a manner of determining a decoding indication parameter may include, but is not limited to: determining a first reference value (the reciprocal of a ratio of a quantity of blocks in the reference frame that are decoded in the skip mode to a total quantity of blocks in the reference frame), a second reference value (the ratio of the first quantity of intra-frame decoded blocks to the second quantity of inter-frame decoded blocks in the reference frame), a third reference value (an energy value of the MV determined according to the energy parameter of the MV in the reference frame (for example, an average value of the MV and/or a variance of the MV)), and a fourth reference value (the ratio of the third quantity of blocks of the first size to the fourth quantity of blocks of the second size in the reference frame) according to the reference decoding parameters in the reference frame, and then weighted summation is performed on the four reference values to obtain the decoding indication parameter.

In this embodiment, a weight corresponding to each reference value may be, but is not limited to, a value between 0 and 1. That is, any combination of at least two of the four reference values may be implemented to obtain the decoding indication parameter. A correspondence between specific weights and the reference values is not limited in this embodiment.

Moreover, in this embodiment, the first resolution may include, but is not limited to: an original resolution of the target video frame to be decoded, and a highest resolution obtained by upsampling the target video frame. The second resolution may include, but is not limited to: a resolution obtained by downsampling the first resolution according to a predetermined sampling ratio. The sampling ratio may be determined according to, but is not limited to, a result of comparison between the ratios and different thresholds. The different thresholds herein may be, but are not limited to, a group of thresholds determined from a value interval greater than the preset threshold.

Further, in this embodiment, the reference frame may include, but is not limited to one of the following: one reference frame in video frames that have been decoded and a plurality of reference frames in the video frames that have been decoded. The plurality of reference frames may include, but are not limited to: a plurality of consecutive reference frames or a plurality of nonconsecutive reference frames.

In an example embodiment, before a target resolution used for decoding a current target video frame is adaptively determined, a determining basis may be determined in, but is not limited to, the following manner:

(1) Determine, in a manner agreed on with an encoding device configured to encode a video frame, a reference basis for adaptively determining a resolution. For example, the encoder side and the decoder side may determine resolutions used on two sides in the same manner according to an agreement in a communication standard. The decoding device on the decoder side may directly determine a reference frame from video frames that have been decoded, and determine a manner of determining the target resolution of the target video frame according to the reference decoding parameters.

(2) Obtain a to-be-decoded bitstream; and parse out a decoding flag bit from the bitstream, the decoding flag bit being used for at least indicating the manner of determining the target resolution of the target video frame according to the reference decoding parameters.

In an example embodiment, the decoding the target video frame by using the target resolution may include, but is not limited to: after the target resolution used for decoding the target video frame is adaptively determined, decoding the target video frame based on the target resolution by using, but is not limited to, the related art:

S1: Determine a current decoding mode corresponding to the target video frame to be decoded. For example, a flag bit corresponding to a preset position in a bitstream is obtained, and information about a current encoding mode is obtained by using the flag bit, thereby determining whether the current decoding mode is a full resolution mode or a downsampling mode. The current decoding mode is the same as the current encoding mode.

S2: Determine a processing reference frame according to a resolution of a current reference frame corresponding to the target video frame and the target resolution of the target video frame obtained through decision-making. It is determined whether the resolution of the current reference frame is the same as the target resolution. If the resolution of the current reference frame is the same as the target resolution, the current reference frame is directly used as the processing reference frame; and if the resolution of the current reference frame is different from the target resolution, S3 is performed.

S3: Sample the current reference frame according to a preset sampling rule, to obtain the corresponding processing reference frame. The preset sampling rule used during decoding is the same as a preset sampling rule used during encoding. For example, the preset sampling rule used on the encoder side may be related to, but is not limited to, a resolution of a current encoded video frame and a distance between the current reference frame and the current encoded video frame. If a distance D between the current reference frame and the current encoded video frame exceeds a preset threshold, 1/M downsampling is used, or otherwise, 1/N downsampling is used, M<N. A reference value of a relatively far reference frame may be less than that of a relatively close reference frame. Therefore, even if the resolution of the relatively far current reference frame is different from that of the current encoded video frame, the relatively far current reference frame may not be sampled, or a resolution change of the relatively far current reference frame after being sampled becomes relatively small. Correspondingly, the decoder side may alternatively perform sampling by using the same method, so that a sampling speed may be accelerated, thereby increasing an entire decoding speed. A value of M varies with the distance D, thereby further improving the flexibility of a sampling parameter.

In addition, if the resolution of the current reference frame is different from a resolution (for example, the target resolution) of a current decoded video frame, the current reference frame is sampled to obtain a processing reference frame having a resolution the same as that of the current decoded video frame. Sampling the current reference frame includes upsampling and downsampling. If the resolution of the current reference frame is greater than that of the current decoded video frame, downsampling is performed on the current reference frame to obtain the processing reference frame. If the resolution of the current reference frame is less than that of the current decoded video frame, upsampling is performed on the current reference frame to obtain the processing reference frame. In an embodiment, if there are a plurality of current reference frames, each current reference frame is sampled according to the resolution of the reference frame and the resolution of the current decoded video frame to obtain a processing reference frame having a resolution the same as that of the current decoded video frame.

Further, in this embodiment, a sampling algorithm used for sampling the current reference frame matches a sampling algorithm used to downsample a reestablished video frame to obtain a decoded video frame. For example, if the reference frame is downsampled, a downsampling algorithm is the same as a downsampling algorithm used to downsample the reestablished video frame to obtain the decoded video frame. If the reference frame is upsampled, an upsampling algorithm is a reverse sampling algorithm matching the downsampling algorithm used to downsample the reestablished video frame to obtain the decoded video frame.

S4: Decode a current decoded video frame according to the processing reference frame, to obtain a reestablished video frame. A prediction residual in the bitstream is decoded and is superimposed with a predicted pixel corresponding to the processing reference frame, to obtain a reestablished video frame.

S5: Process the reestablished video frame according to the current decoding mode, to obtain a decoded video frame, upsample the reestablished video frame to obtain the decoded video frame if the current decoding mode is a downsampling mode, and determine the reestablished video frame as the decoded video frame if information about a current encoding mode is a full sampling mode.

Specifically, an algorithm for upsampling the reestablished video frame is a reverse sampling algorithm matching an algorithm used by an encoder side to downsample a target video frame to obtain a current encoded video frame.

In this embodiment, at least one pair of decoding blocks to be reconstructed are determined from the target video frame, each pair of decoding blocks in the at least one pair of decoding blocks including a first decoding block using a first resolution and a second decoding block using a second resolution, the first decoding block and the second decoding block being adjacent decoding blocks; the first resolution of the first decoding block is adjusted to the target resolution, and the second resolution of the second decoding block is adjusted to the target resolution; a first edge pixel set is determined from the first decoding block, and a second edge pixel set is determined from the second decoding block, a position of the first edge pixel set being adjacent to a position of the second edge pixel set; and the first edge pixel set is filtered, to obtain a filtered first edge pixel set, and the second edge pixel set is filtered, to obtain a filtered second edge pixel set, a first difference between a pixel value of an $i^{th}$ pixel in the filtered first edge pixel set and a pixel value of a $i^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

The manner of adjusting the target resolution includes one of the following:

(1) adjusting the second resolution to the first resolution when the target resolution is equal to the first resolution;
(2) adjusting the first resolution to the second resolution when the target resolution is equal to the second resolution; and
(3) when the target resolution is equal to a third resolution, adjusting the first resolution to the third resolution, and adjusting the second resolution to the third resolution, the third resolution being different from the first resolution and being different from the second resolution.

The resolutions of the decoding blocks are adjusted, and edge filtering is performed on the edge pixel sets determined from the decoding blocks, so that an obvious seam in a video may be avoided during reconstruction, thereby ensuring accurate restoration of content in the video and further resolving the technical problem of video distortion caused by inconsistent resolutions.

According to the embodiments of the disclosure, for a current target video frame in a target video to be decoded, reference decoding parameters in a reference frame may be obtained from video frames that have been decoded before the target video frame, and a target resolution used for decoding the target video frame is determined according to a decoding indication parameter obtained by fusing the reference decoding parameters. The reference decoding parameters include at least one of the following: a first ratio of a quantity of blocks in the reference frame that are decoded in a skip mode to a total quantity of blocks in the reference frame, a second ratio of a first quantity of intra-frame decoded blocks to a second quantity of inter-frame decoded blocks in the reference frame, an energy parameter of an MV in the reference frame, and a third ratio of a third quantity of blocks of a first size to a fourth quantity of blocks of a second size in the reference frame, the first size being less than the second size. For different target video frames, different resolutions may be adaptively selected to ensure the quality of video playing, and a uniform resolution is no longer used for decoding, thereby overcoming the problem of distortion caused by the use of a uniform resolution in the related art.

In an example embodiment, the determining, according to the reference decoding parameters, a target resolution used for decoding the target video frame includes the following operations.

S1: Obtain a decoding indication parameter according to a relationship between the reference decoding parameters.

S2: Use a first resolution as the target resolution when the decoding indication parameter is greater than a preset threshold; and use a second resolution as the target resolution when the decoding indication parameter is less than the preset threshold, the second resolution being greater than the first resolution.

In this embodiment, the first resolution may include, but is not limited to: an original resolution of the target video frame to be decoded, and a highest resolution obtained by upsampling the target video frame. The second resolution may include, but is not limited to: a resolution obtained by sampling the first resolution according to a predetermined sampling ratio. The sampling ratio may be determined according to, but is not limited to, a result of comparison between the ratios and different thresholds. The different thresholds herein may be, but are not limited to, a group of thresholds determined from an interval greater than the preset threshold.

In an example embodiment, the method further includes the following operations.

S1: Determine a group of thresholds from a value interval greater than the preset threshold when the decoding indication parameter is greater than the preset threshold.

S2: Compare the decoding indication parameter with thresholds included in the group of thresholds.

S3: Determine a sampling ratio according to a result of the comparison.

S4: Downsample the second resolution according to the sampling ratio, to determine the first resolution.

In an example embodiment, the determining a sampling ratio according to a result of the comparison includes: obtaining, when it is determined that the decoding indication parameter falls within a target interval, a target sampling ratio configured for the target interval, the target interval including a value between a first threshold and a second threshold that are adjacent in the group of thresholds, the first threshold being less than the second threshold; and the downsampling the second resolution according to the sampling ratio includes: downsampling a width and a height of the second resolution according to the target sampling ratio, to obtain the first resolution.

Specifically, a description is provided with reference to the following example. It is assumed that the preset threshold is A1, the group of thresholds determined from the value interval greater than the preset threshold include: A2 to A5, A3 being less than A2, A4 being less than A3, A5 being less than A4. Further it is assumed that the decoding indication parameter is r. A determining process may be as follows.

When it is determined that r<A1, it indicates that there are a large quantity of same images in the video frames that have been decoded, and correspondingly, the target video frame is decoded by using a high resolution R (for example, the second resolution). When it is determined that r≥A1, then the decoding indication parameter r is compared with thresholds included in the group of thresholds. When it is determined that A2≥r>A3, it may be determined that the sampling ratio is ¾ a width and a height of the high resolution R, and the high resolution R is sampled by using the sampling ratio, to obtain a resolution R' (for example, the first resolution) that is used for decoding. When it is determined that A3≥r>A4, it may be determined that the sampling ratio is ⅔ the width and the height of the high resolution R, and the high resolution R is sampled by using the sampling ratio, to obtain the resolution R' (for example, the first resolution) that is used for decoding. When it is determined that A4≥r>A5, it may be determined that the sampling ratio is ⅓ the width and the height of the high resolution R, and the high resolution R is sampled by using the sampling ratio, to obtain the resolution R' (for example, the first resolution) that is used for decoding.

The foregoing sampling ratio is an example, and the interval corresponding to different thresholds may be set to different values. A value of the sampling ratio and a correspondence between the sampling ratios and the thresholds are not limited in this embodiment.

According to the embodiments of the disclosure, a relationship between reference decoding parameters in a reference frame is obtained, to determine a decoding indication parameter, so that a resolution matching a current target video frame is adaptively selected according to a result of comparison between the decoding indication parameter and a preset threshold, to improve the flexibility of determining the resolution, and a complex determining process is not required, so that the resolutions used for different video frames may be quickly determined during decoding, to improve the decoding efficiency during decoding.

In an example embodiment, the obtaining, from video frames that have been decoded, reference decoding parameters of a reference frame associated with the target video frame includes the following operations.

S1: Determine one reference frame from the video frames that have been decoded as a target reference frame.

S2: Obtain reference decoding parameters in the target reference frame.

In an example embodiment, S1 of determining one reference frame from the video frames that have been decoded as a target reference frame includes: determining a $(t-k)^{th}$ video frame as the target reference frame when the target video frame is a $t^{th}$ video frame; and S2 of obtaining reference decoding parameters in the target reference frame includes: obtaining the reference decoding parameters in the target reference frame from the $(t-k)^{th}$ video frame, k being a predetermined positive integer, t being a positive integer, t being greater than k.

In an example embodiment, after the obtaining reference decoding parameters in the target reference frame, the method further includes: determining first weights that respectively correspond to the reference decoding parameters in the target reference frame; and performing weighted summation on the reference decoding parameters in the target reference frame by using the first weights, to obtain a decoding indication parameter.

Figure 3:
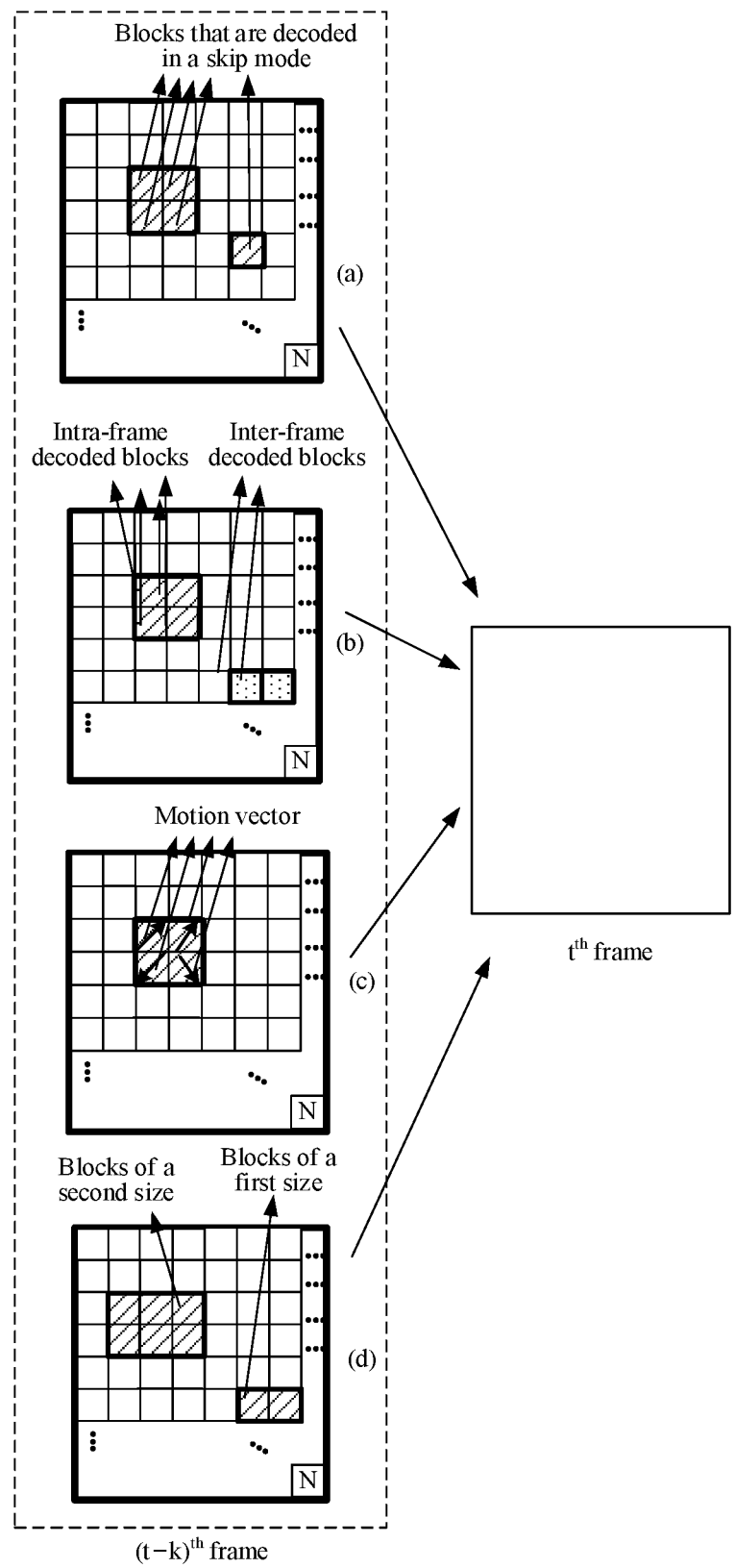
FIG. 3 is a schematic diagram of a video decoding method according to an example embodiment of the disclosure.

For illustrative purposes, a description is provided with reference to the example shown in FIG. 3.

It is assumed that the target video frame to be decoded is a $t^{th}$ video frame, and it is determined that the target reference frame is a $(t-k)^{th}$ video frame from the video frames that have been decoded, a total quantity of blocks in the $(t-k)^{th}$ video frame being N. Further, it is assumed that (1) a quantity M1 of blocks (for example, blocks in which oblique line regions (or regions shaded with oblique lines) are located shown in FIG. 3(a)) that are decoded in a skip mode and a total quantity N of blocks are obtained from the $(t-k)^{th}$ video frame, and a reciprocal (as a first reference value) of a ratio of the two is calculated: P1=1/(M1/N)=N/M1; (2) a quantity Q1 of intra-frame decoded blocks (for example, blocks in which oblique line regions are located shown in FIG. 3(b)) and a quantity Q2 of inter-frame decoded blocks (for example, blocks in which dot regions (or regions shaded with dots) are located shown in FIG. 3(b)) are obtained from the $(t-k)^{th}$ video frame, and a ratio (as a second reference value) is calculated: P2=Q1/Q2; (3) MVs $v_i$ (lines with arrows marked in blocks in which oblique line regions are located shown in FIG. 3(c)) of blocks are obtained from the $(t-k)^{th}$ video frame, and a result of weighted summation on an average value c and a variance D of the MVs $v_i$ is calculated, to obtain an energy value E (as a third reference value); and (4) a quantity T1 of blocks (square regions in which oblique lines are located shown in FIG. 3(d)) of a first size and a quantity T2 of blocks (rectangular regions in which oblique lines are located shown in FIG. 3(d)) of a second size are obtained from the $(t-k)^{th}$ video frame, and a ratio (as a fourth reference value) is calculated: P3=T1/T2.

Subsequently, first weights that respectively correspond to the reference decoding parameters are determined. For example, a weight corresponding to the ratio P1 is w1, a weight corresponding to the ratio P2 is w2, a weight corresponding to E is w3, and a weight corresponding to the ratio P3 is w4, so that weighted summation may be performed on the reference decoding parameters, to obtain a decoding indication parameter r:

$$r=P1*w1+P2*w2+E*w3+P3*w4$$

For example, the decoding indication parameter r is compared with the preset threshold A1. When it is determined that r<A1, it is determined that the target video frame is decoded by using a high resolution R (for example, the second resolution); and when r≥A1, a group of thresholds are obtained from a value interval greater than A1. It is assumed that the group of thresholds include: A2 to A5, A3 being less than A2, A4 being less than A3, A5 being less than A4. It is assumed that it is determined that A4≥r>A5 through the comparison, it may be determined that the sampling ratio is ⅓ a width and a height of the high resolution R (for example, the second resolution), and the high resolution R is sampled by using the sampling ratio, to obtain a resolution R' (for example, the first resolution) to be used for decoding. The $t^{th}$ video frame is decoded by using the resolution R' (for example, the first resolution).

According to the embodiments of the disclosure, after one reference frame is determined from the video frames that have been decoded as the target reference frame, reference decoding parameters in the target reference frame are obtained, to obtain a decoding indication parameter, and a target resolution corresponding to a current target video frame is further adaptively selected by using a result of comparison between the decoding indication parameter and a preset threshold for decoding. A resolution used for decoding the target video frame is quickly determined, thereby overcoming the problem of the relatively low decoding efficiency caused by relatively complex operations of determining the resolution in the related art.

In an example embodiment, the obtaining, from video frames that have been decoded, reference decoding parameters of a reference frame associated with the target video frame includes the following operations.

S1: Determine a plurality of reference frames from the video frames that have been decoded as target reference frames.

S2: Obtain reference decoding parameters in the target reference frames.

In an example embodiment, the determining a plurality of reference frames from the video frames that have been decoded as target reference frames includes: determining a plurality of consecutive video frames or a plurality of nonconsecutive video frames from the video frames that have been decoded as the target reference frames.

Figure 4:
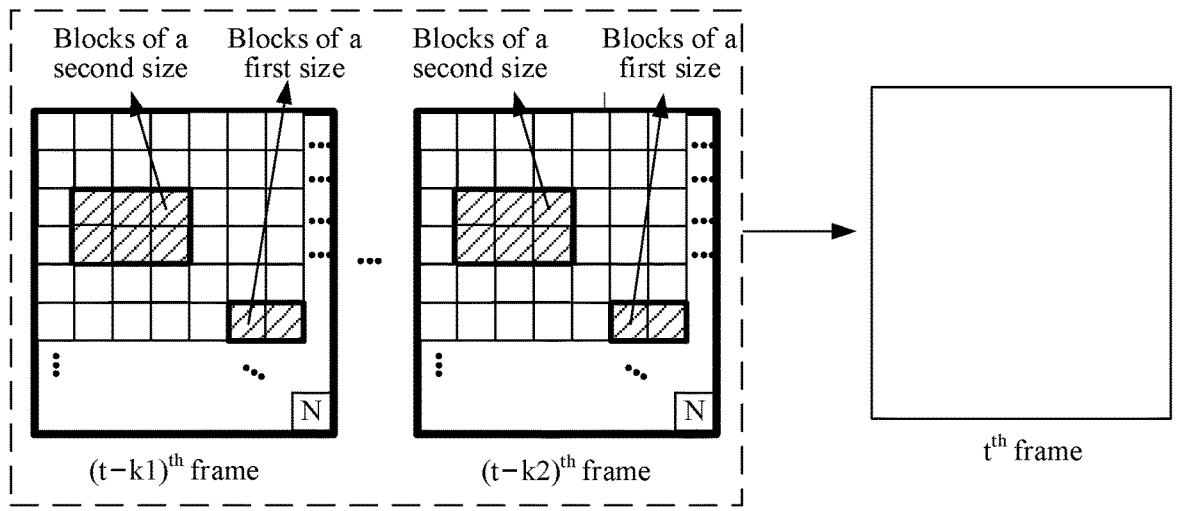
FIG. 4 is a schematic diagram of a video decoding method according to an example embodiment of the disclosure.

For example, the target reference frames may be consecutive reference frames. A plurality of consecutive video frames from a $(t-k1)^{th}$ video frame to a $(t-k2)^{th}$ video frame shown in FIG. 4 are determined as the target reference frames of the target video frame. It is assumed that the ratio of the quantity of blocks of the first size to the quantity of blocks of the second size in the reference decoding parameters is used as an example for description. As shown in FIG. 4, the plurality of reference frames include T1 blocks (small blocks of oblique line regions shown in FIG. 4) of a first size and T2 blocks (large blocks of oblique line regions shown in FIG. 4) of a second size.

In addition, the target reference frames may be alternatively nonconsecutive reference frames. A plurality of discrete video frames are selected from the $(t-k1)^{th}$ video frame to the $(t-k2)^{th}$ video frame shown in FIG. 5. For example, a group of video frames including the $(t-k1)^{th}$ video frame and a group of video frames including the $(t-k2)^{th}$ video frame are determined as the target reference frames of the target video frame to be decoded. It is assumed that the plurality of reference frames include T1 blocks (small blocks of oblique line regions shown in FIG. 5) of a first size and T2 blocks (large blocks of oblique line regions shown in FIG. 5) of a second size.

Figure 5:
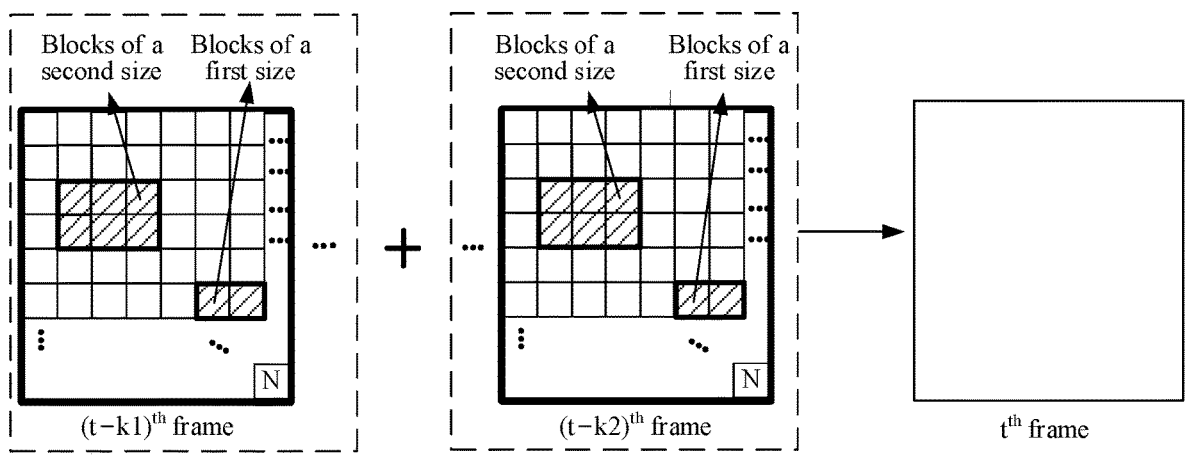
FIG. 5 is a schematic diagram of a video decoding method according to an example embodiment of the disclosure.

In the target reference frames, a total quantity of blocks in each reference frame may be the same value such as N (as shown in FIG. 4 and FIG. 5), or may be different values such as N1, N2, . . . (not shown in the figure). This is not limited in this embodiment.

The parameters k1 and k2 may be, but are not limited to, parameters agreed on with the encoding device on the encoder side in advance, or may be parameters determined by parsing a flag bit at a specified position in a bitstream. This is not limited in this embodiment.

In an example embodiment, S1 of determining a plurality of reference frames from the video frames that have been decoded as target reference frames includes: determining a $(t-k1)^{th}$ video frame to a $(t-k2)^{th}$ video frame as the target reference frames when the target video frame is a $t^{th}$ video frame; and S2 of obtaining reference decoding parameters in the target reference frames includes: obtaining the reference decoding parameters in the target reference frames from the $(t-k1)^{th}$ video frame to the $(t-k2)^{th}$ video frame, k1 and k2 being predetermined positive integers, t being a positive integer, t being greater than k1, k1 being greater than k2.

In an example embodiment, after the obtaining reference decoding parameters in the target reference frames, the method further includes: determining second weights that respectively correspond to the reference decoding parameters in the target reference frames; and performing weighted summation on the reference decoding parameters in the target reference frames by using the second weights, to obtain a decoding indication parameter.

Figure 6:
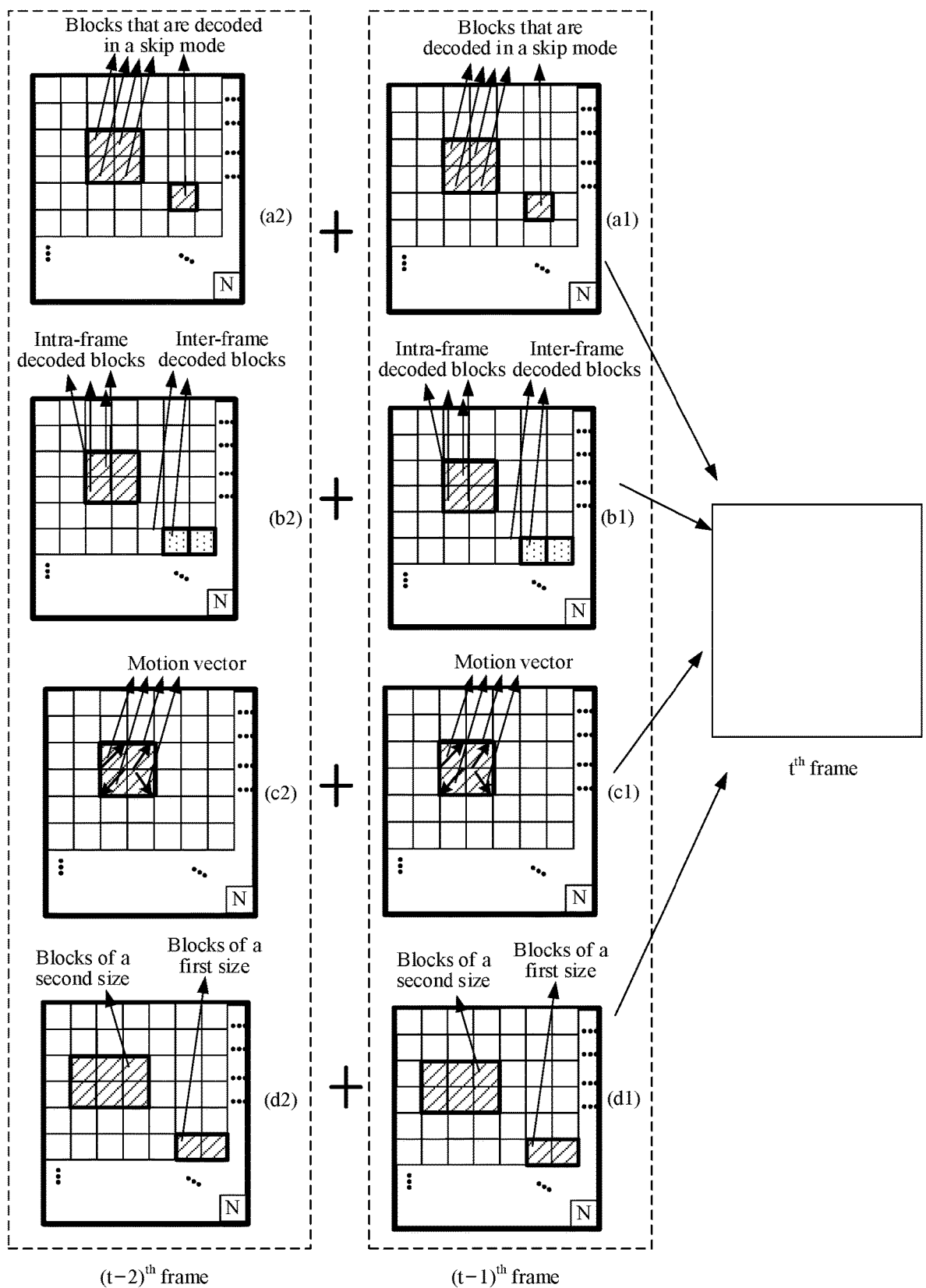
FIG. 6 is a schematic diagram of a video decoding method according to an example embodiment of the disclosure.

For illustrative purposes, a description is provided with reference to the example shown in FIG. 6. It is assumed that the target reference frames are a plurality of consecutive video frames from a $(t-1)^{th}$ video frame to a $(t-2)^{th}$ video frame, a total quantity of blocks in each reference frame being N.

Further, it is assumed that reference decoding parameters obtained from the $(t-1)^{th}$ video frame include: (1) a quantity M1 of blocks (for example, blocks in which oblique line regions are located shown in FIG. 6(*a*1)) that are decoded in a skip mode and a total quantity N of blocks; (2) a quantity Q1 of intra-frame decoded blocks (for example, blocks in which oblique line regions are located shown in FIG. 6(*b*1)) and a quantity Q2 of inter-frame decoded blocks (for example, blocks in which dot regions are located shown in FIG. 6(*b*1)); (3) MVs $v_i$ (for example, lines with arrows marked in blocks in which oblique line regions are located shown in FIG. 6 (*c*1)) of blocks, an energy value E being determined according to an average value ε and a variance D of the MVs $v_i$, for the MVs $v_i$ of pixels, one block corresponding to one pixel as shown in the figure, a line with an arrow in an oblique line block being used for identifying the MV of the pixel; and (4) a quantity T1 of blocks (for example, small blocks of oblique line regions shown in FIG. 6(*d*1)) of a first size and a quantity T2 of blocks (for example, large blocks of oblique line regions shown in FIG. 6(*d*1)) of a second size.

In addition, reference decoding parameters obtained from the $(t-2)^{th}$ video frame include: (1) a quantity M1' of blocks (for example, blocks in which oblique line regions are located shown in FIG. 6(*a*2)) that are decoded in a skip mode and a total quantity N' of blocks; (2) a quantity Q1' of intra-frame decoded blocks (for example, blocks in which oblique line regions are located shown in FIG. 6(*b*2)) and a quantity Q2' of inter-frame decoded blocks (for example, blocks in which dot regions are located shown in FIG. 6(*b*2)); (3) MVs $v_i'$ (for example, lines with arrows marked in blocks in which oblique line regions are located shown in FIG. 6 (*c*2)) of blocks, an energy value E' being determined according to an average value and a variance D' of the MVs $v_i'$, for the MVs of pixels, one block corresponding to one pixel as shown in the figure, a line with an arrow in an oblique line block being used for identifying the MV of the pixel; and (4) a quantity T1' of blocks (for example, small blocks of oblique line regions shown in FIG. 6(*d*2)) of a first size and a quantity T2' of blocks (for example, large blocks of oblique line regions shown in FIG. 6(*d*2)) of a second size.

Further, the second weight may be configured for, but is not limited to, each reference decoding parameter. For example, weighted summation may be performed on the reference decoding parameters, to obtain a decoding indication parameter r:

$$(1) r = (M1+M1')/(N+N')*w1' + (Q1+Q1')/(Q2+Q2') \\ *w2' + (E+E')*w3' + (T1+T1')/(T2+T2')*w4'$$

The formula is to calculate the decoding indication parameter after all information about a plurality of video frames is counted, which is only an optional example.

In addition, reference decoding parameters in video frames may be further calculated respectively, and then weighted summation is performed on results of the video frames. For example, a decoding indication parameter obtained based on reference decoding parameters in a $(t-1)^{th}$ frame is r1, a decoding indication parameter obtained based on reference decoding parameters in a $(t-2)^{th}$ frame is r2, and weighted summation is performed on r1 and r2, to obtain the decoding indication parameter r corresponding to the target reference frames.

In an example embodiment, the target resolution may be further determined in the following manner.

S1: Parse a bitstream to obtain a decoding flag bit corresponding to the target video frame.

S2: Obtain the target resolution indicated by the decoding flag bit.

To simplify operations of determining the target resolution on the decoder side, the encoder side may further directly write the target resolution determined by the encoding device according to the determining manner into a bitstream in a manner of flag bit. The decoding device on the decoder side may directly obtain the determined target resolution after parsing the decoding flag bit from the bitstream.

The decoding flag bit may be indicated by, but is not limited to, the following syntax elements:

(1) obtaining a syntax element corresponding to each target video frame, the syntax element being used for indicating a resolution used for decoding the target video frame, a plurality of resolutions used for decoding a plurality of target video frames including at least two different resolutions; and (2) obtaining a syntax element corresponding to each target video frame in a plurality of target video frames, the syntax element being used for indicating a relationship between a third resolution and a fourth resolution, the third resolution being a resolution used for decoding the target video frame, the fourth resolution being a resolution used for decoding a reference frame of the target video frame, a plurality of resolutions used for decoding the plurality of target video frames including at least two different resolutions; and determining the third resolution corresponding to each region according to the syntax element and the fourth resolution.

In this way, regardless of whether transmission bandwidth is relatively small or is relatively large, a corresponding peak signal to noise ratio (PSNR) is relatively large, and distortion is relatively small, thereby ensuring that the PSNR may change within a relatively small range, and the PSNR is relatively large, thereby achieving the technical effect of avoiding a relatively large fluctuation of the PSNR for encoding and decoding a video.

According to the example embodiments of the disclosure, a determined target resolution required by decoding is directly obtained by using a decoding flag bit, to simplify a processing process of a decoder side, thereby reducing overheads during transmission and the decoding complexity of the decoder side and further achieving the effect of improving the decoding efficiency.

The foregoing descriptions are merely examples. This is not limited in this embodiment.

According to the embodiments of the disclosure, after the plurality of reference frames are determined from the video frames that have been decoded as the target reference frames, reference decoding parameters in the target reference frames are obtained, to obtain a decoding indication parameter, and a target resolution corresponding to a current target video frame is further adaptively selected by using a result of comparison between the decoding indication parameter and a preset threshold for decoding. A resolution used for decoding the target video frame is quickly determined, thereby overcoming the problem of the relatively low decoding efficiency caused by relatively complex operations of determining the resolution in the related art.

Figure 7:
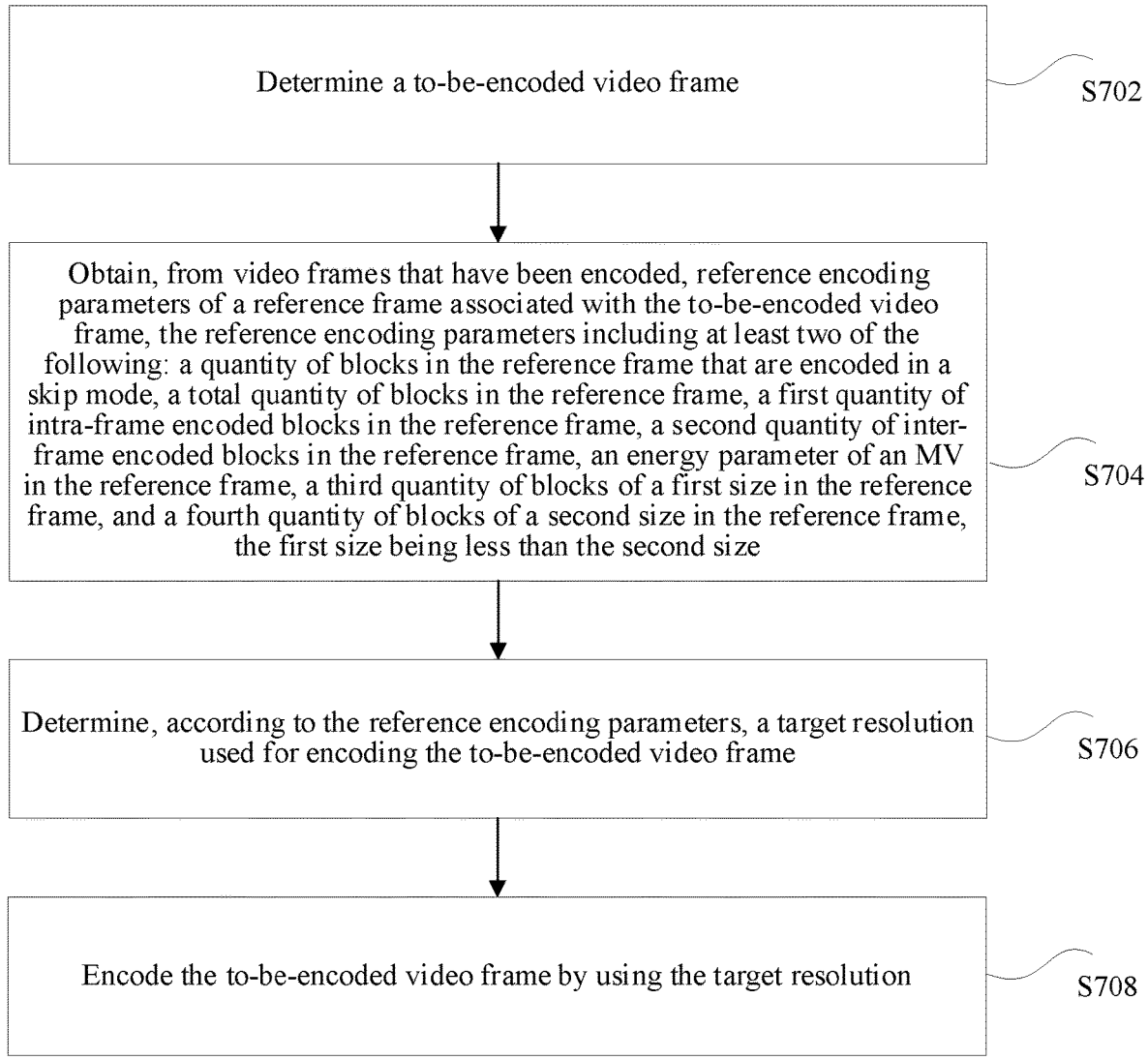
FIG. 7 is a flowchart of a video encoding method according to an example embodiment of the disclosure.

In an example embodiment, as shown in FIG. 7, the video encoding method includes the following operations.

S702: Determine a target video frame (or referred to as a to-be-encoded video frame).

S704: Obtain, from video frames that have been encoded, reference encoding parameters of a reference frame associated with the target video frame, the reference encoding parameters including at least two of the following: a quantity of blocks in the reference frame that are encoded in a skip mode, a total quantity of blocks in the reference frame, a first quantity of intra-frame encoded blocks in the reference frame, a second quantity of inter-frame encoded blocks in the reference frame, an energy parameter of an MV in the reference frame, a third quantity of blocks of a first size in the reference frame, and a fourth quantity of blocks of a second size in the reference frame, the first size being less than the second size.

S706: Determine, according to the reference encoding parameters, a target resolution used for encoding the target video frame.

S708: Encode the target video frame by using the target resolution.

The video encoding method shown in FIG. 7 is applicable to, but is not limited to, the video encoder shown in FIG. 1. An encoding process of the target video frame is completed through interaction and cooperation between the video encoder and another component.

In an example embodiment, the video encoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (for example, the playing time is greater than 10 minutes) or a picture presented in a long video session, and the short video may be a voice message exchanged between two or more parties or a video with a relatively short playing time (for example, the playing time is less than or equal to 30 seconds) presented on a sharing platform. The foregoing is merely an example. The video encoding method provided in this embodiment is applicable to, but is not limited to, the application scenario. After video frames that have been encoded are obtained, a target resolution used for encoding a target video frame is adaptively determined based on reference encoding parameters of a reference frame determined from the video frames, to simplify operations of determining the target resolution used for encoding the target video frame, thereby overcoming the problem of the relatively low video encoding efficiency in the related art and achieving the effect of improving the encoding efficiency.

In this embodiment, for a determined target video frame to be encoded, reference encoding parameters of a reference frame associated with the target video frame may be obtained from video frames that have been encoded, the reference encoding parameters including at least two of the following: a quantity of blocks in the reference frame that are encoded in a skip mode, a total quantity of blocks in the reference frame, a first quantity of intra-frame encoded blocks in the reference frame, a second quantity of inter-frame encoded blocks in the reference frame, an energy parameter of an MV in the reference frame, a third quantity of blocks of a first size in the reference frame, and a fourth quantity of blocks of a second size in the reference frame, the first size being less than the second size; and a target resolution used for encoding the target video frame is determined by using a relationship between the reference encoding parameters, and the target video frame is encoded by using the target resolution. Therefore, the resolution used for encoding the target video frame is determined by using the relationship between the reference encoding parameters in the reference frame, to adaptively select different resolutions used for encoding different target video frames and simplify operations of determining the target resolution used for encoding the target video frame, thereby overcoming the problem of the relatively low video encoding efficiency in the related art and achieving the effect of improving the encoding efficiency.

In an example embodiment, the determining, according to the reference encoding parameters, a target resolution used for encoding the target video frame includes the following operations.

S1: Obtain an encoding indication parameter according to a relationship between the reference encoding parameters.

S2: Use a first resolution as the target resolution when the encoding indication parameter is greater than a preset threshold; and use a second resolution as the target resolution when the encoding indication parameter is less than the preset threshold, the second resolution being greater than the first resolution.

In an example embodiment, the method further includes the following operations.

S1: Determine a group of thresholds from a value interval greater than the preset threshold when the encoding indication parameter is greater than the preset threshold.

S2: Compare the encoding indication parameter with thresholds included in the group of thresholds.

S3: Determine a sampling ratio according to a result of the comparison.

S4: Downsample the second resolution according to the sampling ratio, to determine the first resolution.

In this embodiment, for example embodiments of the video encoding method, reference may be made to, but is not limited to, the example embodiments of the video decoding method described above. Target video frames are encoded by using adaptively determined and matched resolutions in a processing manner opposite to the decoding method. In this embodiment, details are not described herein again.

Figure 8:
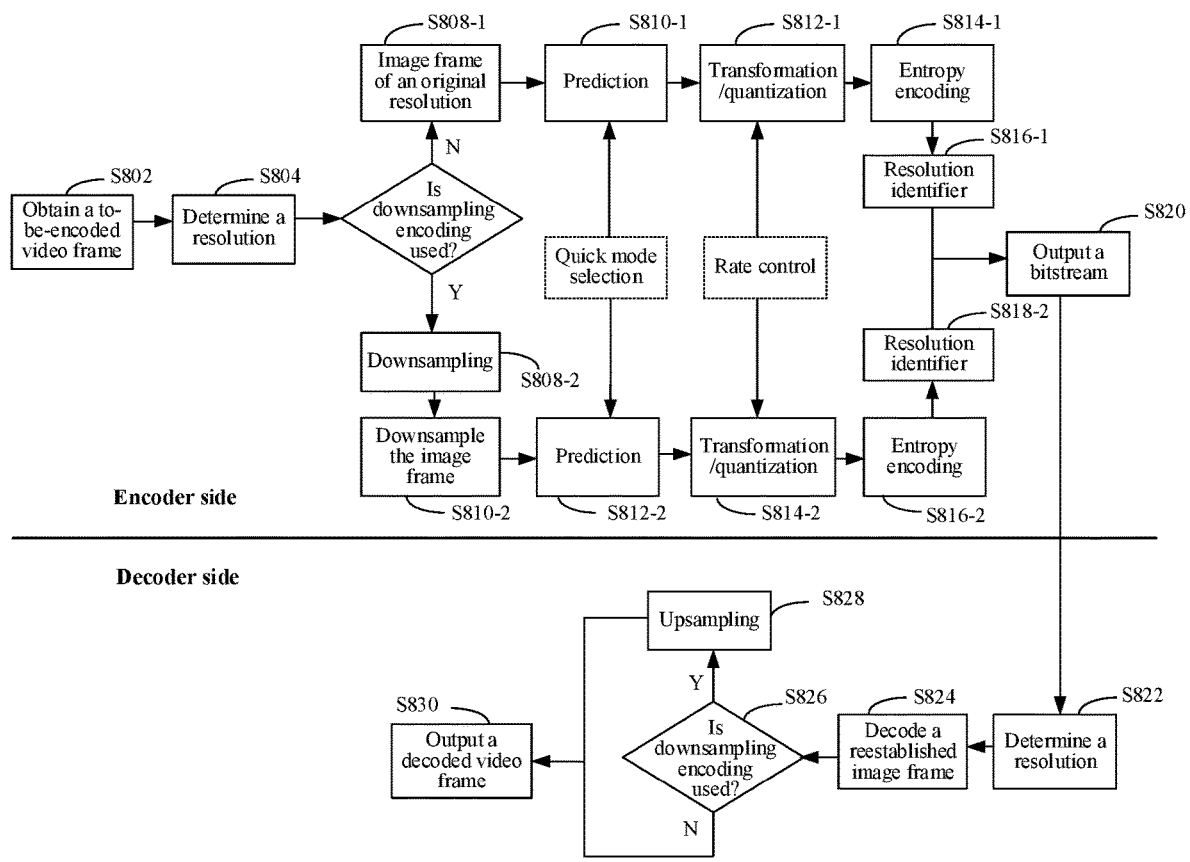
FIG. 8 is a schematic diagram of a video encoding and decoding processes according to an example embodiment of the disclosure.

Specifically, a description is provided with reference to S802 and S830 in the example shown in FIG. 8. A target video frame is obtained on an encoder side, and a resolution used for encoding the target video frame is selected by determining a resolution. Subsequently, a current encoding mode is determined from optional encoding modes according to current encoding information and/or image feature information of the target video frame. If the current encoding mode is a full resolution mode, it is determined that downsampling encoding is not required, and S808-1 to S816-1 are performed; and intra/inter prediction is performed on an image frame with an original resolution to obtain a prediction residual, transformation/quantization and entropy encoding are performed to obtain encoded data, and a resolution identifier of the used resolution is determined. Further, the data is encoded, and as in S820, a bitstream is outputted.

If the current encoding mode is a downsampling mode, downsampling is required, and S810-2 to S818-2 are performed. A downsampling image frame is obtained, intra/inter prediction is performed on the image frame to obtain a prediction residual, transformation/quantization and entropy encoding are performed, to obtain encoded data, and a resolution identifier of the used resolution is determined. Further, the data is encoded, and as in S820, a bitstream is outputted.

Subsequently, the bitstream is inputted into the decoder side. For example, S822 to S830: adaptively determining a target video frame, to determine a resolution of the target video frame, and then decoding the target video frame to obtain a reestablished video frame. If it is determined that the downsampling mode is used, the reestablished video frame is upsampled, to obtain a decoded video frame, or otherwise, the decoded video frame is directly outputted.

The foregoing is merely an example. The video encoding method and the video decoding method provided in this embodiment are applicable to a resolution determining process shown in the figures and used for adaptively determining resolutions for different target video frames/target video frames on an encoder side and a decoder side, to simplify a process of determining resolutions used for frames during encoding and decoding, thereby achieving the effect of improving the encoding and decoding efficiency.

For ease of description, the foregoing method embodiments are stated as a combination of a series of actions. However, a person skilled in the art is to know that the disclosure is not limited to the described action sequence, because according to the disclosure, some operations may be performed in another sequence or simultaneously. In addition, a person skilled in the art is also to understand that the embodiments described in this specification are all example embodiments, and the involved actions and modules are not necessarily required by the disclosure.

Figure 9:
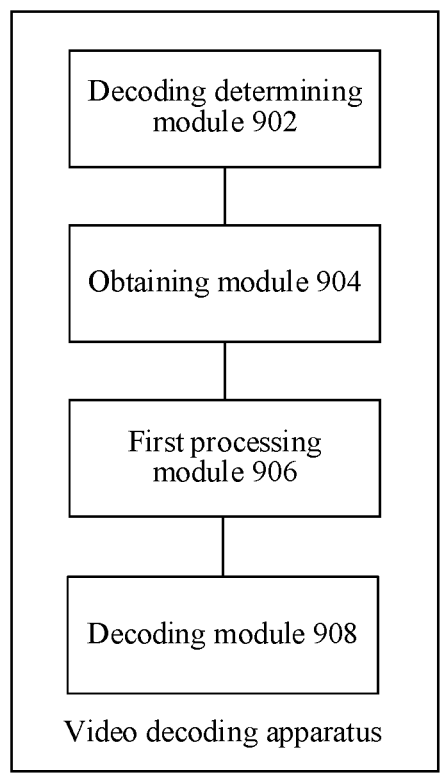
FIG. 9 is a schematic structural diagram of a video decoding apparatus according to an example embodiment of the disclosure.

According to another aspect of the embodiments of the disclosure, a video decoding apparatus for implementing the video decoding method is further provided. As shown in FIG. 9, the apparatus includes:

(1) a decoding determining module 902, configured to determine a target video frame;

(2) an obtaining module 904, configured to obtain, from video frames that have been decoded, reference decoding parameters of a reference frame associated with the target video frame, the reference decoding parameters including at least two of the following: a quantity of blocks in the reference frame that are decoded in a skip mode, a total quantity of blocks in the reference frame, a first quantity of intra-frame decoded blocks in the reference frame, a second quantity of inter-frame decoded blocks in the reference frame, an energy parameter of an MV in the reference frame, a third quantity of blocks of a first size in the reference frame, and a fourth quantity of blocks of a second size in the reference frame, the first size being less than the second size;

(3) a first processing module 906, configured to determine, according to the reference decoding parameters, a target resolution used for decoding the target video frame; and (4) a decoding module 908, configured to decode the target video frame by using the target resolution.

For example embodiments of the video decoding apparatus, reference may be made to the example shown in the foregoing video decoding method described above, and details are not described herein again in this example.

In an example embodiment, the first processing module 906 includes:

(1) a first determining submodule, configured to obtain a decoding indication parameter according to a relationship between the reference decoding parameters; and 2) a first processing submodule, configured to use a first resolution as the target resolution when the decoding indication parameter is greater than a preset threshold; and further configured to use a second resolution as the target resolution when the decoding indication parameter is less than the preset threshold, the second resolution being greater than the first resolution.

For the example embodiments, reference may be made to the example shown in the foregoing video decoding method, and details are not described herein again in this example.

In an example embodiment, the first processing module further includes:

(1) a second determining submodule, configured to determine a group of thresholds from a value interval greater than the preset threshold when the decoding indication parameter is greater than the preset threshold;

(2) a comparison submodule, configured to compare the decoding indication parameter with thresholds included in the group of thresholds;

3) a third determining submodule, configured to determine a sampling ratio according to a result of the comparison; and (4) a sampling submodule, configured to downsample the second resolution according to the sampling ratio, to determine the first resolution.

In an example embodiment, the third determining submodule determines the sampling ratio according to the result of the comparison by using the following operations: obtaining, when it is determined that the decoding indication parameter falls within a target interval, a target sampling ratio configured for the target interval, the target interval including a value between a first threshold and a second threshold that are adjacent in the group of thresholds, the first threshold being less than the second threshold; and the downsampling the second resolution according to the sampling ratio includes: downsampling a width and a height of the second resolution according to the target sampling ratio, to obtain the first resolution.

For the example embodiments, reference may be made to the example shown in the foregoing video decoding method, and details are not described herein again in this example.

In an example embodiment, the obtaining module 904 includes:
(1) a fourth determining submodule, configured to determine one reference frame from the video frames that have been decoded as a target reference frame; and
2) a first obtaining submodule, configured to obtain reference decoding parameters in the target reference frame.

For the example embodiments, reference may be made to the example shown in the foregoing video decoding method, and details are not described herein again in this example.

In an example embodiment,
(1) the fourth determining submodule includes: (1) a first determining unit, configured to determine a $(t-k)^{th}$ video frame as the target reference frame when the target video frame is a $t^{th}$ video frame; and
(2) the first obtaining submodule includes: (1) a first obtaining unit, configured to obtain the reference decoding parameters in the target reference frame from the $(t-k)^{th}$ video frame, k being a predetermined positive integer, t being a positive integer, t being greater than k.

For the example embodiments, reference may be made to the example shown in the foregoing video decoding method, and details are not described herein again in this example.

In an example embodiment, the obtaining module further includes:
(1) a fifth determining submodule, configured to determine, after the reference decoding parameters in the target reference frame are obtained, first weights that respectively correspond to the reference decoding parameters in the target reference frame; and
(2) a first operation submodule, configured to perform weighted summation on the reference decoding parameters in the target reference frame by using the first weights, to obtain a decoding indication parameter.

For the example embodiments, reference may be made to the example shown in the foregoing video decoding method, and details are not described herein again in this example.

In an example embodiment, the obtaining module 904 includes:
(1) a sixth determining submodule, configured to determine a plurality of reference frames from the video frames that have been decoded as target reference frames; and
2) a second obtaining submodule, configured to obtain reference decoding parameters in the target reference frames.

In an example embodiment, the sixth determining submodule determines the plurality of reference frames from the video frames that have been decoded as the target reference frames by using the following operations: determining a plurality of consecutive video frames or a plurality of nonconsecutive video frames from the video frames that have been decoded as the target reference frames.

For the example embodiments, reference may be made to the example shown in the foregoing video decoding method, and details are not described herein again in this example.

In an example embodiment,
(1) the sixth determining submodule includes: (1) a second determining unit, configured to determine a $(t-k1)^{th}$ video frame to a $(t-k2)^{th}$ video frame as the target reference frames when the target video frame is a $t^{th}$ video frame; and
(2) the second obtaining submodule includes: (1) a second obtaining unit, configured to obtain the reference decoding parameters in the target reference frames from the $(t-k1)^{th}$ video frame to the $(t-k2)^{th}$ video frame, k1 and k2 being predetermined positive integers, t being a positive integer, t being greater than k1, k1 being greater than k2.

For the example embodiments, reference may be made to the example shown in the foregoing video decoding method, and details are not described herein again in this example.

In an example embodiment, the obtaining module further includes:
(1) a seventh determining submodule, configured to determine, after the reference decoding parameters in the target reference frames are obtained, second weights that respectively correspond to the reference decoding parameters in the target reference frames; and
(2) a second operation submodule, configured to perform weighted summation on the reference decoding parameters in the target reference frames by using the second weights, to obtain a decoding indication parameter.

For the example embodiments, reference may be made to the example shown in the foregoing video decoding method, and details are not described herein again in this example.

Figure 10:
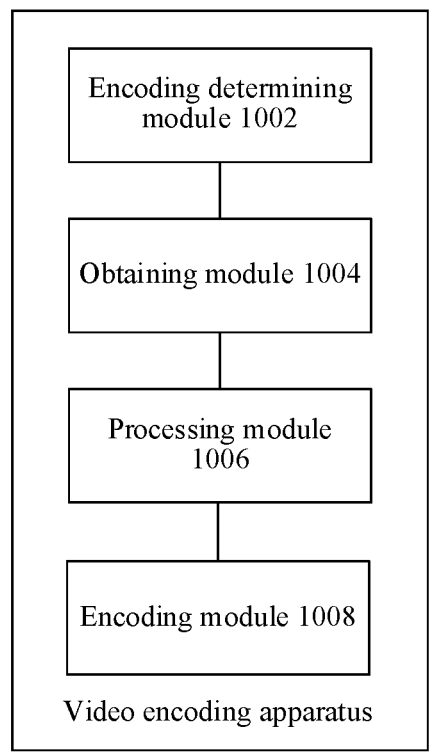
FIG. 10 is a schematic structural diagram of a video encoding apparatus according to an example embodiment of the disclosure.

According to another aspect of the embodiments of the disclosure, a video encoding apparatus for implementing the video encoding method is further provided. As shown in FIG. 10, the apparatus includes:
(1) an encoding determining module 1002, configured to determine a target video frame in a target video;
(2) an obtaining module 1004, configured to obtain, from video frames that have been encoded before the target video frame, reference encoding parameters of a reference frame, the reference encoding parameters including at least two of the following: a quantity of blocks in the reference frame that are encoded in a skip mode, a total quantity of blocks in the reference frame, a first quantity of intra-frame encoded blocks in the reference frame, a second quantity of inter-frame encoded blocks in the reference frame, an energy parameter of a motion vector in the reference frame, a third quantity of blocks of a first size in the reference frame, and a fourth quantity of blocks of a second size in the reference frame, the first size being less than the second size;
(3) a processing module 1006, configured to determine, according to an encoding indication parameter obtained by fusing the reference encoding parameters, a target resolution used for encoding the target video frame; and
(4) an encoding module 1008, configured to encode the target video frame by using the target resolution.

For the example embodiments, reference may be made to the example shown in the foregoing video encoding method, and details are not described herein again in this example.

In an example embodiment, the processing module 1006 includes:
(1) a first determining submodule, configured to obtain an encoding indication parameter according to a relationship between the reference encoding parameters; and
(2) a first processing submodule, configured to use a first resolution as the target resolution when the encoding indication parameter is greater than a preset threshold; and further configured to use a second resolution as the target resolution when the encoding indication parameter is less than the preset threshold, the second resolution being greater than the first resolution.

For the example embodiments, reference may be made to the example shown in the foregoing video encoding method, and details are not described herein again in this example.

In an example embodiment, the processing module further includes:

(1) a second determining submodule, configured to determine a group of thresholds from a value interval greater than the preset threshold when the encoding indication parameter is greater than the preset threshold;

(2) a comparison submodule, configured to compare the encoding indication parameter with thresholds included in the group of thresholds;

3) a third determining submodule, configured to determine a sampling ratio according to a result of the comparison; and (4) a sampling submodule, configured to downsample the second resolution according to the sampling ratio, to determine the first resolution.

For the example embodiments, reference may be made to the example shown in the foregoing video encoding method, and details are not described herein again in this example.

According to still another aspect of the embodiments of the disclosure, an electronic device for implementing the foregoing video decoding method is further provided. The electronic device shown in FIG. 11 and FIG. 12 may be the foregoing video processing device.

Figure 11:
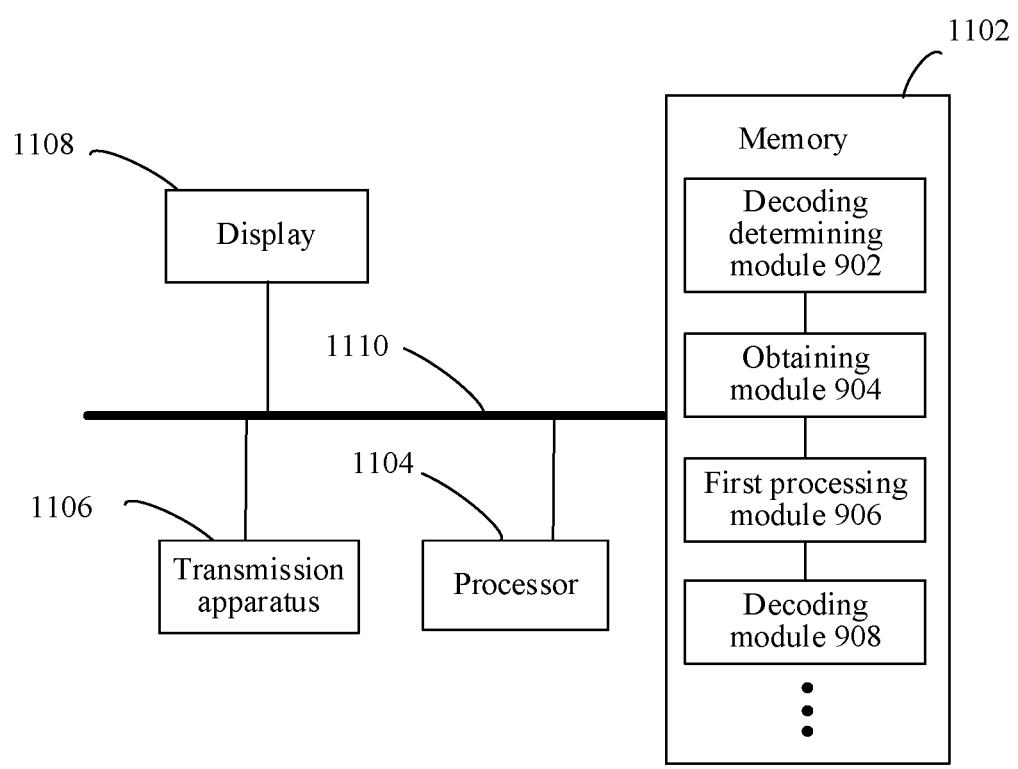
FIG. 11 is a schematic structural diagram of an electronic device according to an example embodiment of the disclosure.

As shown in FIG. 11, the electronic device includes a memory 1102 and a processor 1104. The memory 1102 stores a computer program. The processor 1104 is configured to perform the operations in any one of the foregoing method embodiments by executing the computer program.

In an example embodiment, the electronic device may be located in at least one of a plurality of network devices in a computer network.

In an example embodiment, the processor may be configured to perform the following operations by executing the computer program.

S1: Determine a target video frame.

S2: Obtain, from video frames that have been decoded, reference decoding parameters of a reference frame associated with the target video frame, the reference decoding parameters including at least two of the following: a quantity of blocks in the reference frame that are decoded in a skip mode, a total quantity of blocks in the reference frame, a first quantity of intra-frame decoded blocks in the reference frame, a second quantity of inter-frame decoded blocks in the reference frame, an energy parameter of an MV in the reference frame, a third quantity of blocks of a first size in the reference frame, and a fourth quantity of blocks of a second size in the reference frame, the first size being less than the second size.

S3: Determine, according to the reference decoding parameters, a target resolution used for decoding the target video frame.

S4: Decode the target video frame by using the target resolution.

A person of ordinary skill in the art would understand that the structure shown in FIG. 11 is only schematic and given as an example. The electronic device may be a terminal device such as a smartphone (such as an Android mobile phone or an iOS mobile phone), a tablet computer, a palmtop computer, a mobile Internet device (MID), or a PAD. FIG. 11 does not limit the structure of the electronic device. For example, the electronic device may further include more or fewer components (such as a network interface) than shown in FIG. 11, or have a configuration different from that shown in FIG. 11.

The memory 1102 may be configured to store a software program and a module, for example, a program instruction/module corresponding to the video decoding method and apparatus in the embodiments of the disclosure, and the processor 1104 performs various functional applications and data processing by running a software program and a module stored in the memory 1102, that is, implementing the foregoing video decoding method. The memory 1102 may include a high-speed random access memory, and may also include a non-volatile memory, for example, one or more magnetic storage apparatuses, a flash memory, or another non-volatile solid-state memory. In some embodiments, the memory 1102 may further include memories remotely disposed relative to the processor 1104, and the remote memories may be connected to a terminal through a network. Examples of the network include, but are not limited to, the Internet, an intranet, a local area network, a mobile communication network, and a combination thereof. The memory 1102 may be specifically configured to, but is not limited to, store information such as a target video frame. As an example, as shown in FIG. 11, the memory 1102 may include, but is not limited to, the decoding determining module 902, the obtaining module 904, the first processing module 906, and the decoding module 908 in the video decoding apparatus. In addition, the memory may further include, but is not limited to, other modules and units in the foregoing video decoding apparatus. Details are not described in this example again.

In an example embodiment, the foregoing transmission apparatus 1106 is configured to receive or transmit data through a network. Specific examples of the foregoing network may include a wired network and a wireless network. In an example, the transmission apparatus 1106 includes a network interface controller (NIC). The NIC may be connected to another network device and a router by using a network cable, so as to communicate with the Internet or a local area network. In an example, the transmission apparatus 1106 is a radio frequency (RF) module, which communicates with the Internet in a wireless manner.

In addition, the electronic device further includes: a display 1108, configured to display a decoded video; and a connection bus 1110, configured to connect various module components in the electronic device.

Figure 12:
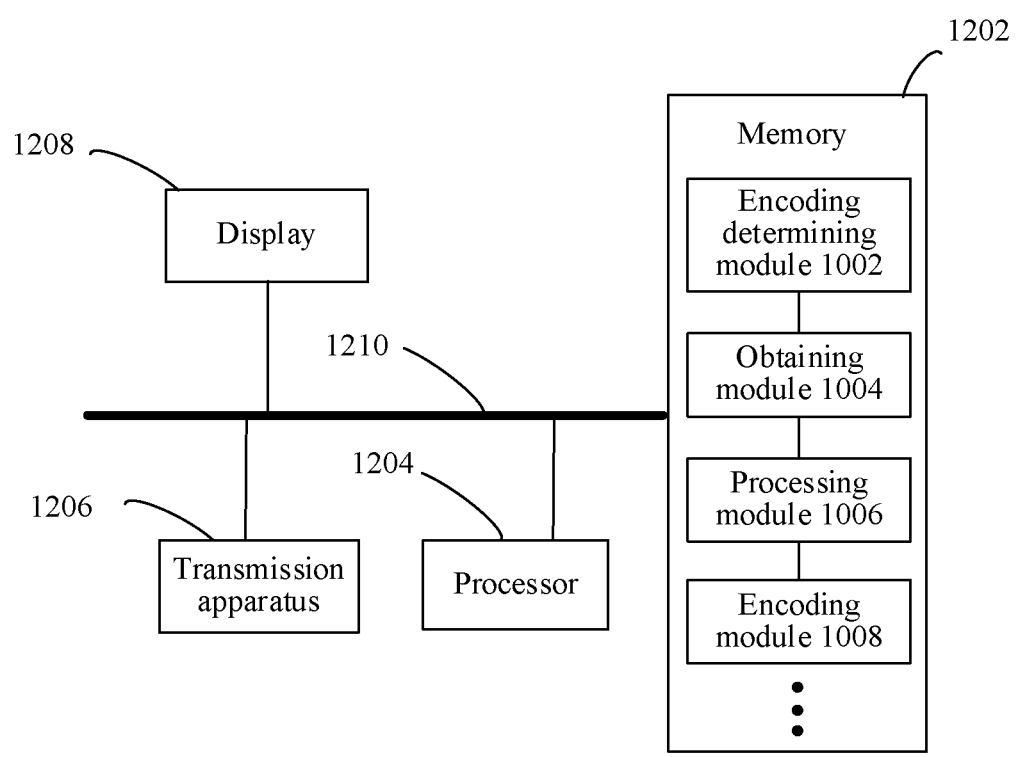
FIG. 12 is a schematic structural diagram of an electronic device according to an example embodiment of the disclosure.

According to yet another aspect of the embodiments of the disclosure, an electronic device for implementing the foregoing video encoding method is further provided. As shown in FIG. 12, the electronic device includes a memory 1202 and a processor 1204. The memory 1202 stores a computer program, and the processor 1204 is configured to perform the operations in any one of the method embodiments by executing the computer program.

In an example embodiment, the electronic device may be located in at least one of a plurality of network devices in a computer network.

In an example embodiment, the processor may be configured to perform the following operations by executing the computer program.

S1: Determine a target video frame.

S2: Obtain, from video frames that have been encoded, reference encoding parameters of a reference frame associated with the target video frame, the reference encoding parameters including at least two of the following: a quantity of blocks in the reference frame that are encoded in a skip mode, a total quantity of blocks in the reference frame, a first quantity of intra-frame encoded blocks in the reference frame, a second quantity of inter-frame encoded blocks in the reference frame, an energy parameter of an MV in the reference frame, a third quantity of blocks of a first size in the reference frame, and a fourth quantity of blocks of a second size in the reference frame, the first size being less than the second size.

S3: Determine, according to the reference encoding parameters, a target resolution used for encoding the target video frame.

S4: Encode the target video frame by using the target resolution.

A person of ordinary skill in the art would understand that, the structure shown in FIG. 12 is only schematic and given as an example. The electronic device may be a terminal device such as a smartphone (such as an Android mobile phone or an iOS mobile phone), a tablet computer, a palmtop computer, a MID, or a PAD. FIG. 12 does not limit the structure of the electronic device. For example, the electronic device may further include more or fewer components (such as a network interface) than shown in FIG. 12, or have a configuration different from that shown in FIG. 12.

The memory 1202 may be configured to store a software program and a module, for example, a program instruction/module corresponding to the video encoding method and apparatus in the embodiments of the disclosure, and the processor 1204 performs various functional applications and data processing by running a software program and a module stored in the memory 1202, that is, implementing the foregoing video encoding method. The memory 1202 may include a high-speed random access memory, and may also include a non-volatile memory, for example, one or more magnetic storage apparatuses, a flash memory, or another non-volatile solid-state memory. In some embodiments, the memory 1202 may further include memories remotely disposed relative to the processor 1204, and the remote memories may be connected to a terminal through a network. Examples of the network include, but are not limited to, the Internet, an intranet, a local area network, a mobile communication network, and a combination thereof. The memory 1202 may be specifically configured to, but is not limited to, information such as a target video frame. As an example, as shown in FIG. 12, the memory 1202 may include, but is not limited to, the encoding determining module 1002, the obtaining module 1004, the processing module 1006, and the encoding module 1008 in the video encoding apparatus. In addition, the memory may further include, but is not limited to, other modules and units in the foregoing video encoding apparatus. Details are not described in this example again.

In an example embodiment, the foregoing transmission apparatus 1206 is configured to receive or transmit data through a network. Specific examples of the foregoing network may include a wired network and a wireless network. In an example, the transmission apparatus 1206 includes a NIC. The NIC may be connected to another network device and a router by using a network cable, so as to communicate with the Internet or a local area network. In an example, the transmission apparatus 1206 is a radio frequency (RF) module, which communicates with the Internet in a wireless manner.

In addition, the electronic device further includes: a display 1208, configured to display a video before being encoded; and a connection bus 1210, configured to connect various module components in the electronic device.

According to still another aspect of the embodiments of the disclosure, a computer-readable storage medium is further provided. The computer-readable storage medium stores a computer program, the computer program being configured to perform operations in any one of the foregoing method embodiments when being run.

In an example embodiment, the computer-readable storage medium may be configured to store a computer program configured to perform the following operations.

S1: Determine a target video frame to be decoded.

S2: Obtain, from video frames that have been decoded, reference decoding parameters of a reference frame associated with the target video frame, the reference decoding parameters including at least two of the following: a quantity of blocks in the reference frame that are decoded in a skip mode, a total quantity of blocks in the reference frame, a first quantity of intra-frame decoded blocks in the reference frame, a second quantity of inter-frame decoded blocks in the reference frame, an energy parameter of an MV in the reference frame, a third quantity of blocks of a first size in the reference frame, and a fourth quantity of blocks of a second size in the reference frame, the first size being less than the second size.

S3: Determine, according to the reference decoding parameters, a target resolution used for decoding the target video frame.

S4: Decode the target video frame by using the target resolution.

In an example embodiment, the computer-readable storage medium may be further configured to store a computer program configured to perform the following operations.

S1: Determine a target video frame to be encoded.

S2: Obtain, from video frames that have been encoded, reference encoding parameters of a reference frame associated with the target video frame, the reference encoding parameters including at least two of the following: a quantity of blocks in the reference frame that are encoded in a skip mode, a total quantity of blocks in the reference frame, a first quantity of intra-frame encoded blocks in the reference frame, a second quantity of inter-frame encoded blocks in the reference frame, an energy parameter of an MV in the reference frame, a third quantity of blocks of a first size in the reference frame, and a fourth quantity of blocks of a second size in the reference frame, the first size being less than the second size.

S3: Determine, according to the reference encoding parameters, a target resolution used for encoding the target video frame.

S4: Encode the target video frame by using the target resolution.

In the example embodiments of the disclosure, for a current target video frame in a target video, reference decoding parameters in a reference frame may be obtained from video frames that have been decoded before the target video frame, and a target resolution based on a decoding indication parameter obtained by fusing the reference decoding parameters. The reference decoding parameters include at least one of the following: a first ratio of a quantity of blocks in the reference frame that are decoded in a skip mode to a total quantity of blocks in the reference frame, a second ratio of a first quantity of intra-frame decoded blocks to a second quantity of inter-frame decoded blocks in the reference frame, an energy parameter of an MV in the reference frame, and a third ratio of a third quantity of blocks of a first size to a fourth quantity of blocks of a second size in the reference frame, the first size being less than the second size. For different target video frames, different resolutions may be adaptively selected to ensure the quality of video playing, and a uniform resolution is no longer used for decoding, thereby resolving the technical problem of relatively low video encoding and decoding efficiency caused by complex processing operations provided in the related art.

An embodiment of the disclosure further provides a computer program product including instructions, the computer program product, when run on a computer, causing the computer to perform the video decoding method or the video encoding method according to the foregoing embodiments.

In an example embodiment, a person of ordinary skill in the art would understand that all or some of the operations of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of the disclosure are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of the disclosure essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the operations of the methods described in the embodiments of the disclosure.

In the foregoing embodiments of the disclosure, descriptions of the embodiments have respective focuses. As for parts that are not described in detail in one embodiment, reference may be made to the relevant descriptions of the other embodiments.

In the several embodiments provided in the disclosure, it is to be understood that, the disclosed client may be implemented in another manner. The apparatus embodiments described above are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units may be integrated into one unit. The integrated unit may be implemented in a form of hardware, or may be implemented in a form of a software functional unit.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure. A person of ordinary skill in the art may further make several improvements and modifications without departing from the principle of the disclosure, and the improvements and modifications are also considered as falling within the protection scope of the disclosure.

What is claimed is:

1. A video decoding method, performed by a video processing device, the method comprising:
    obtaining, from video frames that have been decoded, reference decoding parameters of a reference frame associated with a target video frame, the reference decoding parameters comprising two or more of the following: (i) a reciprocal of a ratio between a quantity of blocks in the reference frame that are decoded in a skip mode and a total quantity of blocks in the reference frame, (ii) a ratio of a first quantity of intra-frame decoded blocks to a second quantity of inter-frame decoded blocks in the reference frame, (iii) an energy parameter of a motion vector (MV) in the reference frame, and (iv) a ratio between a quantity of blocks of a first size in the reference frame and a quantity of blocks of a second size in the reference frame, the first size being less than the second size;
    obtaining a decoding indication parameter by performing weighted summation on the two or more reference decoding parameters, and determining a target resolution based on the decoding indication parameter; and
    decoding the target video frame by using the target resolution.

2. The method according to claim 1, wherein the determining the target resolution comprises:
    determining a first resolution as the target resolution based on the decoding indication parameter being greater than a preset threshold, or determining a second resolution as the target resolution based on the decoding indication parameter being less than the preset threshold, the second resolution being greater than the first resolution.

3. The method according to claim 2, wherein the decoding indication parameter is greater than the preset threshold, and the method further comprises:
   determining a group of thresholds from a value interval greater than the preset threshold;
   comparing the decoding indication parameter with thresholds included in the group of thresholds;
   determining a sampling ratio based on a result of comparison; and
   downsampling the second resolution based on the sampling ratio, to determine the first resolution.

4. The method according to claim 3, wherein the determining the sampling ratio comprises:
   obtaining, based on determination that the decoding indication parameter falls within a target interval, a target sampling ratio corresponding to the target interval, the target interval comprising a value between a first threshold and a second threshold in the group of thresholds, the first threshold being less than the second threshold and the second threshold being closest to the first threshold among thresholds that are greater than the first threshold among the group of thresholds; and
   the downsampling the second resolution comprises:
   downsampling a width and a height of the second resolution based on the target sampling ratio, to obtain the first resolution.

5. The method according to claim 1, wherein the obtaining the reference decoding parameters comprises:
   determining one reference frame from the video frames that have been decoded as a target reference frame; and
   obtaining the reference decoding parameters in the target reference frame.

6. The method according to claim 5, wherein the determining the one reference frame comprises:
   determining a $(t-k)^{th}$ video frame as the target reference frame based on the target video frame being a $t^{th}$ video frame; and
   the obtaining the reference decoding parameters comprises:
   obtaining the reference decoding parameters in the target reference frame from the $(t-k)^{th}$ video frame, k being a predetermined positive integer, t being a positive integer, t being greater than k.

7. The method according to claim 5, wherein after the obtaining the reference decoding parameters in the target reference frame, the method further comprises:
   determining first weights that respectively correspond to the reference decoding parameters in the target reference frame; and
   performing the weighted summation on the reference decoding parameters in the target reference frame by using the first weights, to obtain the decoding indication parameter.

8. The method according to claim 1, wherein the obtaining the reference decoding parameters comprises:
   determining a plurality of reference frames from the video frames that have been decoded as target reference frames; and
   obtaining the reference decoding parameters in the target reference frames.

9. The method according to claim 8, wherein the determining the plurality of reference frames comprises:
   determining a plurality of consecutive video frames or a plurality of nonconsecutive video frames from the video frames that have been decoded as the target reference frames.

10. The method according to claim 8, wherein the determining the plurality of reference frames comprises:
    determining a $(t-k1)^{th}$ video frame to a $(t-k2)^{th}$ video frame as the target reference frames based on the target video frame being a $t^{th}$ video frame; and
    the obtaining the reference decoding parameters comprises:
    obtaining the reference decoding parameters in the target reference frames from the $(t-k1)^{th}$ video frame to the $(t-k2)^{th}$ video frame, k1 and k2 being predetermined positive integers, t being a positive integer, t being greater than k1, k1 being greater than k2.

11. The method according to claim 8, wherein after the obtaining the reference decoding parameters in the target reference frames, the method further comprises:
    determining second weights that respectively correspond to the reference decoding parameters in the target reference frames; and
    performing the weighted summation on the reference decoding parameters in the target reference frames by using the second weights, to obtain the decoding indication parameter.

12. The method according to claim 1, wherein the determining the target resolution comprises:
    parsing a bitstream to obtain a decoding flag bit corresponding to the target video frame; and
    obtaining the target resolution indicated by the decoding flag bit.

13. A video encoding method, performed by a video processing device, the method comprising:
    obtaining, from video frames that have been encoded, reference encoding parameters of a reference frame associated with a target video frame, the reference encoding parameters comprising two or more of the following: (i) a reciprocal of a ratio between a quantity of blocks in the reference frame that are encoded in a skip mode and a total quantity of blocks in the reference frame, (ii) a ratio of a first quantity of intra-frame decoded blocks to a second quantity of inter-frame decoded blocks in the reference frame, (iii) an energy parameter of a motion vector (MV) in the reference frame, and (iv) a ratio between a quantity of blocks of a first size in the reference frame and a quantity of blocks of a second size in the reference frame, the first size being less than the second size;
    obtaining an encoding indication parameter by performing weighted summation on the two or more reference decoding parameters, and determining a target resolution based on the encoding indication parameter; and
    encoding the target video frame by using the target resolution.

14. The method according to claim 13, wherein the determining the target resolution comprises:
    determining a first resolution as the target resolution based on the encoding indication parameter being greater than a preset threshold, or determining a second resolution as the target resolution based on the encoding indication parameter being less than the preset threshold, the second resolution being greater than the first resolution.

15. The method according to claim 14, wherein the encoding indication parameter is greater than the preset threshold, and the method further comprises:

determining a group of thresholds from a value interval greater than the preset threshold;

comparing the encoding indication parameter with thresholds included in the group of thresholds;

determining a sampling ratio based on a result of comparison; and downsampling the second resolution based on the sampling ratio, to determine the first resolution.

16. A video decoding apparatus, comprising:

at least one memory configured to store program code; and at least one processor configured to read the program code and operate as instructed by the program code, the program code comprising:

obtaining code configured to cause the at least one processor to obtain, from video frames that have been decoded, reference decoding parameters of a reference frame associated with a target video frame, the reference decoding parameters comprising two or more of the following: (i) a reciprocal of a ratio between a quantity of blocks in the reference frame that are decoded in a skip mode and a total quantity of blocks in the reference frame, (ii) a ratio of a first quantity of intra-frame decoded blocks to a second quantity of inter-frame decoded blocks in the reference frame, (iii) an energy parameter of a motion vector (MV) in the reference frame, and (iv) a ratio between a quantity of blocks of a first size in the reference frame and a quantity of blocks of a second size in the reference frame, the first size being less than the second size;

first processing code configured to cause the at least one processor to obtain a decoding indication parameter by performing weighted summation on the two or more reference decoding parameters, and determine a target resolution based on the decoding indication parameter; and decoding code configured to cause the at least one processor to decode the target video frame by using the target resolution.

17. A non-transitory computer-readable storage medium, storing a computer program, the computer program being executable by at least one processor of the video processing device configured to perform the video decoding method according to claim 1.

18. A non-transitory computer-readable storage medium, storing a computer program, the computer program being executable by at least one processor of the video processing device configured to perform the video encoding method according to claim 13.

19. A video processing device, comprising:

a memory configured to store program code; and a processor configured to invoke instructions of the program code in the memory to perform the method according to claim 13.

\* \* \* \* \*